(12) United States Patent
Darnell et al.

(10) Patent No.: US 8,745,161 B2
(45) Date of Patent: *Jun. 3, 2014

(54) DETERMINING AND DISPLAYING A COUNT OF UNREAD ITEMS IN CONTENT FEEDS

(75) Inventors: Benjamin G. Darnell, Palo Alto, CA (US); Justin Christopher Haugh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,498

(22) Filed: Oct. 27, 2011

(65) Prior Publication Data

US 2012/0042012 A1    Feb. 16, 2012

Related U.S. Application Data

(63) Continuation of application No. 11/862,139, filed on Sep. 26, 2007, now Pat. No. 8,060,634.

(51) Int. Cl.
*G06F 15/16* (2006.01)

(52) U.S. Cl.
USPC .......................................... 709/218; 709/219

(58) Field of Classification Search
USPC ....................................................... 709/218
See application file for complete search history.

(56) References Cited

U.S. PATENT DOCUMENTS

| | | | |
|---|---|---|---|
| 5,659,742 A | 8/1997 | Beattie et al. |
| 5,872,921 A | 2/1999 | Zahariev et al. |
| 6,138,147 A | 10/2000 | Weaver et al. |
| 6,148,330 A | 11/2000 | Puri et al. |
| 6,154,752 A | 11/2000 | Ryan |
| 6,587,127 B1 | 7/2003 | Leeke et al. |
| 6,701,350 B1 | 3/2004 | Mitchell |
| 6,831,667 B1 | 12/2004 | Russin et al. |
| 7,003,759 B2 | 2/2006 | Jameson |
| 7,047,502 B2 | 5/2006 | Petropoulos et al. |
| 7,149,353 B2 | 12/2006 | Siegel et al. |
| 7,181,682 B1 | 2/2007 | Manson |
| 7,246,014 B2 | 7/2007 | Forth et al. |
| 7,293,019 B2 | 11/2007 | Dumais et al. |

(Continued)

FOREIGN PATENT DOCUMENTS

| | | |
|---|---|---|
| CN | 1473301 A | 2/2004 |
| KR | 10-0445784 | 8/2004 |
| WO | WO 03/058534 A1 | 7/2003 |
| WO | WO 2005/089336 A2 | 9/2005 |

OTHER PUBLICATIONS

I. Rose, R. Murty, P. Pietzuch, J. Ledlie, M. Roussopoulos, and M. Welsh. Cobra: Content-based Filtering and Aggregation of Blogs and RSS Feeds. In NSDI, Apr. 11-13, 2007, Cambridge, MA.*

(Continued)

*Primary Examiner* — Christopher Biagini
(74) *Attorney, Agent, or Firm* — Morgan, Lewis & Bockius LLP

(57) ABSTRACT

A method quantifies unread content items for a stream subscribed to by a user. The stream includes a time-ordered list of content items from two or more content feeds. Each content feed includes a set of content items published by a respective publication source. The method includes determining a count of content items having an unread status in accordance with read state information stored for the user with respect to the stream, and transmitting the count to a client system for display.

24 Claims, 25 Drawing Sheets

(56) References Cited

U.S. PATENT DOCUMENTS

| | | | |
|---|---|---|---|
| 7,360,167 B2 | 4/2008 | Hennum et al. | |
| 7,383,266 B2 | 6/2008 | Stewart et al. | |
| 7,412,534 B2 | 8/2008 | Tsang et al. | |
| 7,581,166 B2 | 8/2009 | Renger et al. | |
| 7,590,691 B2 | 9/2009 | Gonsalves et al. | |
| 7,665,036 B1 | 2/2010 | Lin et al. | |
| 7,770,130 B1 | 8/2010 | Kaptelinin | |
| 7,818,659 B2 | 10/2010 | Kahn et al. | |
| 7,865,830 B2 | 1/2011 | Kim et al. | |
| 2002/0004821 A1* | 1/2002 | Togawa et al. | 709/206 |
| 2002/0096563 A1 | 7/2002 | Singhal | |
| 2002/0165881 A1 | 11/2002 | Shelton | |
| 2003/0050863 A1 | 3/2003 | Radwin | |
| 2003/0097453 A1 | 5/2003 | Fuchigami et al. | |
| 2004/0189695 A1 | 9/2004 | Kurtz et al. | |
| 2004/0204128 A1 | 10/2004 | Zakharia et al. | |
| 2005/0021680 A1 | 1/2005 | Ekis et al. | |
| 2005/0033657 A1 | 2/2005 | Herrington et al. | |
| 2005/0114790 A1 | 5/2005 | Dunbar et al. | |
| 2005/0131866 A1 | 6/2005 | Badros et al. | |
| 2005/0132067 A1 | 6/2005 | Bennett et al. | |
| 2005/0135361 A1 | 6/2005 | Lim et al. | |
| 2005/0188320 A1* | 8/2005 | Bocking | 715/752 |
| 2005/0193010 A1 | 9/2005 | DeShan et al. | |
| 2005/0198125 A1 | 9/2005 | Macleod Beck et al. | |
| 2005/0216452 A1 | 9/2005 | Teague | |
| 2005/0240531 A1 | 10/2005 | Wolff, Jr. | |
| 2005/0289468 A1 | 12/2005 | Kahn et al. | |
| 2006/0002317 A1 | 1/2006 | Punaganti Venkata | |
| 2006/0015651 A1 | 1/2006 | Freimuth et al. | |
| 2006/0031335 A1 | 2/2006 | Carey | |
| 2006/0059225 A1 | 3/2006 | Stonehocker et al. | |
| 2006/0073812 A1 | 4/2006 | Punaganti Venkata et al. | |
| 2006/0095507 A1 | 5/2006 | Watson | |
| 2006/0095628 A1 | 5/2006 | Ludwig et al. | |
| 2006/0112076 A1 | 5/2006 | Burris et al. | |
| 2006/0129917 A1 | 6/2006 | Volk et al. | |
| 2006/0155698 A1 | 7/2006 | Vayssiere | |
| 2006/0167860 A1 | 7/2006 | Eliashberg et al. | |
| 2006/0173985 A1 | 8/2006 | Moore | |
| 2006/0230021 A1 | 10/2006 | Diab et al. | |
| 2006/0265503 A1 | 11/2006 | Jones et al. | |
| 2006/0279799 A1 | 12/2006 | Goldman | |
| 2006/0282822 A1 | 12/2006 | Weng | |
| 2006/0288011 A1 | 12/2006 | Gandhi et al. | |
| 2007/0016609 A1 | 1/2007 | Kim et al. | |
| 2007/0027865 A1 | 2/2007 | Bartz et al. | |
| 2007/0038712 A1 | 2/2007 | Affronti et al. | |
| 2007/0060136 A1 | 3/2007 | Ramer et al. | |
| 2007/0061333 A1 | 3/2007 | Ramer et al. | |
| 2007/0061711 A1 | 3/2007 | Bodin et al. | |
| 2007/0078884 A1 | 4/2007 | Ott, IV et al. | |
| 2007/0083468 A1 | 4/2007 | Wetherell | |
| 2007/0083520 A1 | 4/2007 | Shellen et al. | |
| 2007/0083536 A1 | 4/2007 | Darnell et al. | |
| 2007/0094390 A1 | 4/2007 | Nussey | |
| 2007/0100959 A1 | 5/2007 | Eichstaedt et al. | |
| 2007/0100978 A1* | 5/2007 | Levi et al. | 709/223 |
| 2007/0130589 A1 | 6/2007 | Davis et al. | |
| 2007/0159651 A1 | 7/2007 | Disario et al. | |
| 2007/0162842 A1 | 7/2007 | Ambachtsheer et al. | |
| 2007/0168522 A1 | 7/2007 | Van Valen | |
| 2007/0174487 A1 | 7/2007 | Busey | |
| 2007/0192318 A1 | 8/2007 | Ramer et al. | |
| 2007/0203906 A1 | 8/2007 | Cone et al. | |
| 2007/0204308 A1 | 8/2007 | Nicholas et al. | |
| 2007/0226207 A1 | 9/2007 | Tawde | |
| 2007/0240041 A1 | 10/2007 | Pearson | |
| 2007/0244901 A1* | 10/2007 | Mohler et al. | 707/10 |
| 2007/0271202 A1 | 11/2007 | O'Connor | |
| 2008/0010337 A1 | 1/2008 | Hayes et al. | |
| 2008/0013266 A1 | 1/2008 | Yamada et al. | |
| 2008/0046459 A1 | 2/2008 | Hinohara | |
| 2008/0052742 A1 | 2/2008 | Kopf et al. | |
| 2008/0117911 A1 | 5/2008 | Rajakarunanayake et al. | |
| 2008/0126476 A1 | 5/2008 | Nicholas et al. | |
| 2008/0155118 A1 | 6/2008 | Glaser et al. | |
| 2008/0214155 A1 | 9/2008 | Ramer et al. | |

OTHER PUBLICATIONS

Rai, Preeta. "Using Bloglines (or How to keep up with dozens of blogs everyday)". Apr. 25, 2005. <http://web.archive.org/web/20060902191956/http://preetamrai.com/weblog/archives/2005/04/25/bloglines-how-to-keep-track-of-hundreds-of-blogs-and-some-news-and-some-podcasts-and-some-flickrs-photos-etc-etc/>. pp. 1-35.*

Trapani, Gina. "Geek to Live: From Bloglines to Google Reader." Oct. 6, 2006. <http://lifehacker.com/205786/geek-to-live--from-bloglines-to-google-reader>. pp. 1-5.*

Rowse, Darren et al. "Bloglines add Keyboard Shortcuts—Hotkeys". Oct. 13, 2005. <http://www.problogger.net/archives/2005/10/13/bloglines-add-keyboard-shortcuts-hotkeys/>. pp. 1-7.*

Parmar. "Unread email in Outlook subfolders". Mar. 21, 2005. <http://www.mofeel.net/887-microsoft-public-pocketpc/27092.aspx>. pp. 1-3.* guillep2k. "New 'mark as read' feature behavior." Mar. 26, 2002. <http://forum.doom9.org/showthread.php?t=21816>. pp. 1-8.*

"Apple Mail's notification badge cracks a joke." Hawk Wings. Nov. 27, 2005. <http://www.hawkwings.net/2005/11/27/apple-mails-notification-badge-cracks-a-joke/>. pp. 1-2.*

"GettingStartedRojo," 6 pages, Nov. 27, 2005, http://web.archive.org/web/20051127084615/rojo.jot.com/GettingStartedRojo.

"Rojo's Frequently Asked Questions (FAQ)," 13 pages, Dec. 2, 2005, http://web.archive.org/web/20051202045411/rojo.jot.com/FAQ.

"Rojo Tour," 27 pages, Aug. 1, 2005, http://web.archive.org/web/20050801014123/rojo.jot.com/RojoTour.

Nottingham, N., et al., "The Atom Syndication Format," The Internet Society, Aug. 15, 2005, http://www.ietf.org/internet-drafts/draft-ieft-atompub-format-11.txt.

Winer, D., "RSS 2.0 Specification," Jan. 30, 2005, http://blogs.law.harvard.edu/tech/rss.

"Check Your Feedburner RSS Feed Size," May 19, 2009, http://wvvw.quickonlinetips.com/archive/2009/05//feedburner-rss-fee-size/.

Cold, S.J., "Using Really Simple Syndication (RSS) to Enhance Student Research," SIGTE News!, 3, 1 (Jan. 2006), pp. 6-9.

About StumbleUpon, Press Review, Sep. 26, 2004, 2 pgs.

Adachi, Implementation of Bookmark with Categorization and Metadata, Proceedings of 67th National Convention in 2005(3) Database and Media, Network, Japan, Information Processing Society of Japan, Mar. 2, 2005, pp. 3-137 to 3-138.

Amazon.com: buying info: Let It Be [soundtrack] screenshot from Wayback Machine, Aug. 13, 2001, 7 pgs.

Blogger Buzz: Next Blog, Now With Less Spam!, Sep. 2, 2005, 2 pgs.

Daily, Aggregating the aggregators RSS reader round-up, Apr. 2005, 6 pgs.

Flickr:Help:Photos, How do I upload my photos?, Feb. 28, 2007, 13 pgs.

Google, International Preliminary Report on Patentability, PCT/US06/39566, Mar. 25, 2010, 10 pgs.

Google, International Search Report, PCT/US2006/039265, May 14, 2007, 6 pgs.

Google, International Search Report and Written Opinion, PCT/US2006/039263, Feb. 26, 2007, 7 pgs.

Google, International Search Report and Written Opinion, PCT/US2006/039566, Jan. 23, 2007, 9 pgs.

Google, International Search Report and Written Opinion, PCT/US2007/079981, Feb. 20, 2008, 8 pgs.

Google, Office Action, Australian Patent Application 2006302318, Mar. 8, 2011, 2 pgs.

Google, Office Action, Canadian Patent Application 2624868, May 10, 2011, 3 pgs.

Google, Office Action, Chinese Patent Application 200780044075.8, Sep. 13, 2010, 8 pgs.

Google, Office Action, Chinese Patent Application 201110228972.2, Apr. 23, 2012, 12 pgs.

(56) References Cited

OTHER PUBLICATIONS

Google, Office Action, European Patent Application 07843545.0, Jul. 13, 2011, 5 pgs.
Google, Office Action, Japanese Patent Application 2008-534740, Dec. 19, 2011, 4 pgs.
Google, Supplementary European Search Report, European Patent Application 07843545.0, Oct. 11, 010, 4 pgs.
Hammersley, Content Syndication with RSS, Jan. 15, 2007, 24 pgs.
Jarrett, NusEye: Designing for Social Navigation in Syndicated Content, TAPIA '05, Albuquerque NM, Oct. 19-22, 2005, pp. 17-19.
Kennedy, Beating Information Overload with News Aggregators, Nov./Dec. 2003, 5 pgs.
Kennedy, Weblogs, Social Software, and New Interactivity on the Web, Psychiatric Services, vol. 55, No. 3, Mar. 2004, 3 pgs.
Launch: Music on Yahoo!, Apr. 25, 2004, 2 pgs.
Martindale, Using Weblogs in Scholarship and Teaching, TechTrends, vol. 49, No. 2, 2005, 9 pgs.
Moreover, Creating a Custom Feed, Feb. 28, 2007, 3 pgs.
Moreover, Put Free headlines on your site—in any topic!, Feb. 28, 2007, 2 pgs.
Paterson, Putting RSS Web Feeds to Work Feature, Feeding Time, Feb. 2004, 4 pgs.
RSSOwl Elements: The Main Screen, Sep. 8, 2006, 1 pg.
Sifry, Sifry's Alerts, New Technorati Features: Favorites, and Readling Lists/OPML for Blog Finder, Feb. 21, 2006, 5 pgs.
Stumble Upon Press Overview, Search vs. Stumble: Using search engines to locate relevant content . . . , Jan. 11, 2006, 2 pages.
Stumble Upon Press Overview, Stumble Upon integrates peer-to-peer and social networking principles . . . , Jan. 11, 2006, 2 pgs.
StumbleUpon Reviews, It lets you search, browse, review and share great sites . . . , Jan. 1, 2006, 5 pgs.
Takizawa, An RSS Reader Based on Multiple User's Information, Proceedings of 67th National Convention in 2005(3) Database and Media, Network, Japan, Information Processing Society of Japan, Mar. 2, 2005, pp. 3-197 to 3-198, 6 pgs.
Technorati Favorites, Add a Favorite, Feb. 28, 2007, 3 pgs.
Wikipedia, List of feed aggregators, Mar. 21, 2008, 2 pgs.
Yahoo! News—Front Page, Top Stories, May 9, 2004, 3 pgs.
Yahoo! News—Most Emailed Photos, Yahoo! News, Apr. 2, 2004, 2 pgs.
Google Inc., Decision of Rejection, JP 2008-534740, Aug. 15, 2013, 3 pgs.
Google Inc., Notice to File a Response, KR 2009-708586, Sep. 26, 2013, 6 pgs.
RSSOwl elements, the main screen, Nov. 7, 2005, 2 pgs.
Google Inc., Office Action, CN 201110228972.2, Dec. 14, 2012, 10 pgs.
Google Inc., Office Action, JP 2008-534740, Oct. 9, 2012, 6 pgs.

* cited by examiner

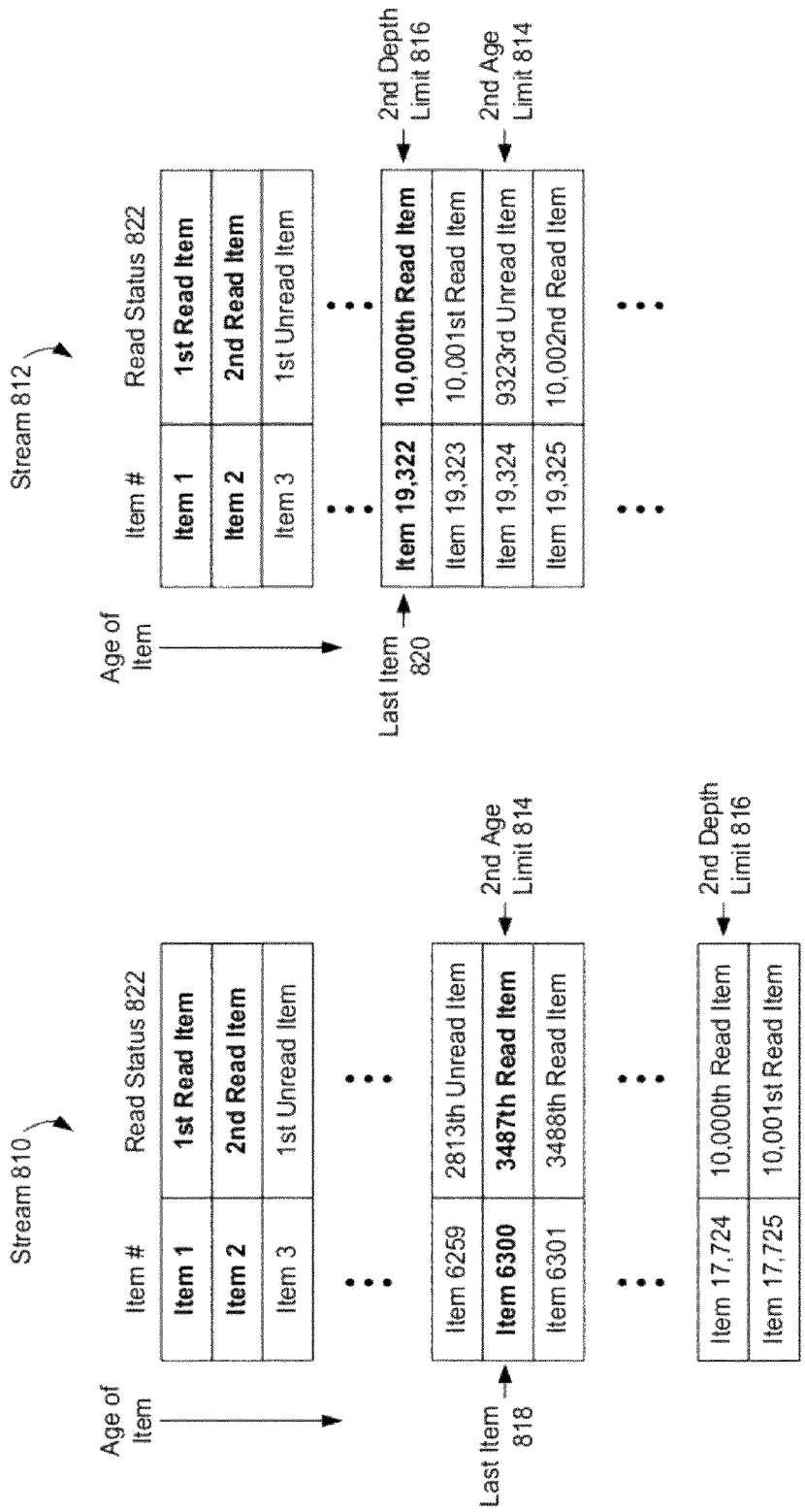

User Subscription Table 1125

| | Stream1 1130 Feed ID: URL1 | Stream2 1132 Feed ID: URL2 | Stream3 1134 Feed ID: User1:tech | Stream4 1136 Feed ID: User2:friends | Stream5 1138 Feed ID: User25:tech |
|---|---|---|---|---|---|
| 1142 User 1 | √ label:tech | √ label:tech | | | |
| User 2 | | | √ label:friends | | √ label:friends |
| User 3 1144 | √ | | | √ | |

DETERMINING AND DISPLAYING A COUNT OF UNREAD ITEMS IN CONTENT FEEDS

RELATED APPLICATION

This application is a continuation of U.S. application Ser. No. 11/862,139, filed Sep. 26, 2007 now U.S. Pat No. 8,060,634, which is incorporated by reference herein in its entirety.

TECHNICAL FIELD

The disclosed embodiments relate generally to content syndication, and more particularly, to content feed user interfaces for viewing content feed items.

BACKGROUND

Content syndication is growing in popularity as a way to distribute frequently updated information, such as news and blog postings, on the Internet. Using content syndication formats such as Really Simple Syndication (RSS), content providers can include content and/or links to such content in a content feed. Users may subscribe to these content feeds using an application known as a feed reader, content feed reader, feed aggregator or content feed aggregator. When the content feed is updated with new content items, the new content items are reflected in the user's reader.

SUMMARY

A method quantifies unread content items for a stream subscribed to by a user. The stream includes a time-ordered list of content items from two or more content feeds. Each content feed includes a set of content items published by a respective publication source. The method includes determining a count of content items having an unread status in accordance with read state information stored for the user with respect to the stream, and transmitting the count to a client system for display.

A system quantifies unread content items in a stream subscribed to by a user. The stream includes a time-ordered list of content items from two or more content feeds. Each content feed includes a set of content items published by a respective publication source. The system includes memory, one or more processors, and one or more programs stored in the memory and configured for execution by the one or more processors. The one or more programs include: instructions for determining a count of content items having an unread status in accordance with read state information stored for the user with respect to the stream; and instructions for transmitting the count to a client system for display.

A computer program product is used to quantify unread content items in a stream subscribed to by a user. The stream includes a time-ordered list of content items from two or more content feeds. Each content feed includes a set of content items published by a respective publication source. The computer program product includes a computer readable storage medium and a computer program mechanism embedded therein. The computer program mechanism includes: instructions for determining a count of content items having an unread status in accordance with read state information stored for the user with respect to the stream; and instructions for transmitting the count to a client system for display.

A system quantifies unread content items in a stream subscribed to by a user. The stream includes a time-ordered list of content items from two or more content feeds. Each content feed includes a set of content items published by a respective publication source. The system includes: means for determining a count of content items having an unread status in accordance with read state information stored for the user with respect to the stream; and means for transmitting the count to a client system for display.

BRIEF DESCRIPTION OF THE DRAWINGS

FIGS. 8A-8E illustrate time-ordered lists of content items in accordance with some embodiments.

FIGS. 11A-11D are diagrams illustrating data structures for feed content items and user subscriptions, in accordance with some embodiments.

Like reference numerals refer to corresponding parts throughout the drawings.

DESCRIPTION OF EMBODIMENTS

In a content feed aggregation system, a user may subscribe to one or more content feeds and be presented with the content items included in those content feeds. The content items may be presented to the user in an ordered list, such that the format of each item in the list is uniform. However, the user may desire to view additional information about content items beyond that provided by a uniform list. The disclosed embodiments provide the user with ways to view additional information about various items. For example, in one mode of operation, when a user selects a first content item, the selected item is displayed in an expanded format, and other items are displayed in a compact format. When the user subsequently selects a second content item, the second item is displayed in the expanded format and the first item is displayed in the compact format. In another example, unread items are displayed in a visually distinctive format from items that have been read or marked as read, thus providing the user with information about the read status of various items. In some embodiments, a count of unread items in a content feed is displayed.

Content feeds are also herein called feed streams. The feed items from a content feed source can be considered to be a stream of items. Furthermore, some embodiments of the content feed aggregation and distribution system described herein allow users to define virtual streams that incorporate content items from content feeds and/or other virtual streams.

Thus, in these embodiments, the term "feed streams," or simply "streams," also encompasses virtual streams defined by the users of the content feed aggregation and distribution system.

Figure 1:
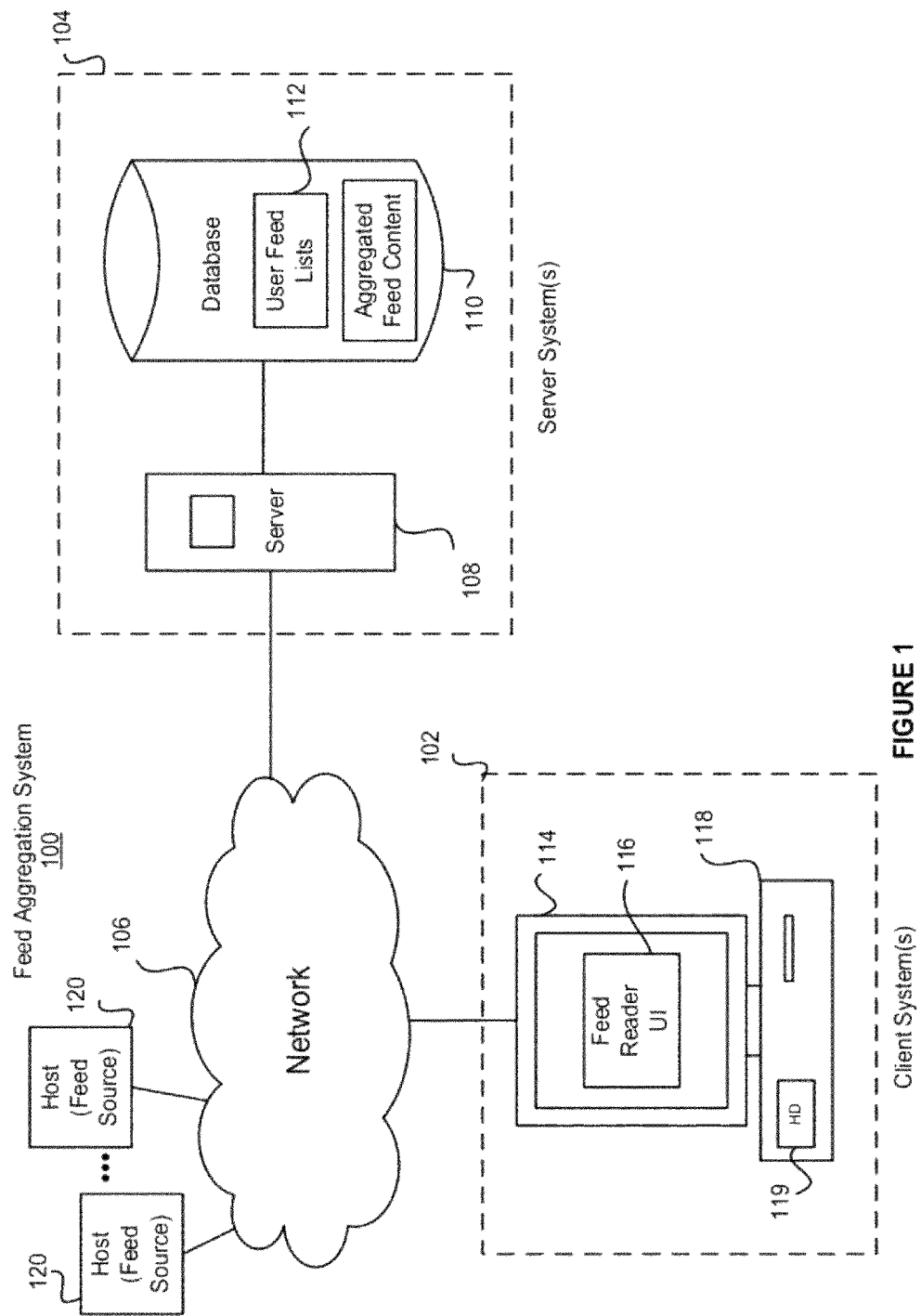
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, metropolitan area network (MAN), or any combination of such networks.

The server system 104 accesses content feeds from the feed sources 120. The server system 104 includes a server 108 and a database 110. Server 108 serves as a front-end for the server system 104. Server 108, sometimes called a front end server, retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and whether feed items have been marked as "read" by the user. User feed information associated with a user also may identify whether the user has marked an entire feed as "read," such that all items in the feed with timestamps dated prior to a specified time are marked as "read."

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a personal digital assistant (PDA), cellular telephone or the like. The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 104. For example, the web page(s) may include a Javascript application that interfaces with the server system 104 via an application programming interface (API). The Javascript application receives content items from the server system 104, manages the rendering of those content items at the client, and also performs the client-side aspects of other tasks, such as marking items or feed streams as read, adding and removing content feed subscriptions, labeling content feed subscriptions and/or individually selected content items, selecting or revising user preferences, and the like. The user may subscribe to content feeds, view content items, and otherwise interact with the server system 104 by interacting with the web page(s) of the feed reader user interface 116. In other words, the server system 104, including the feed reader user interface 116, provides a web-based content aggregation service. The server system 104 aggregates and stores content items in accordance with the user's content feed subscriptions. In some embodiments, the server system 104 can also apply filters or labels, change the read states of content items or feed streams in accordance with user actions or instructions, and calculate the number of content items in a feed stream with read states indicating that the items have not been read. When the user accesses the feed reader user interface 116, the content items are presented to the user via the feed reader user interface 116.

In some other embodiments, the feed reader user interface 116 may be a part of a standalone application that is run on the client system 102. The standalone application may interface with the server system 104 via an application programming interface (API).

Figure 2A:
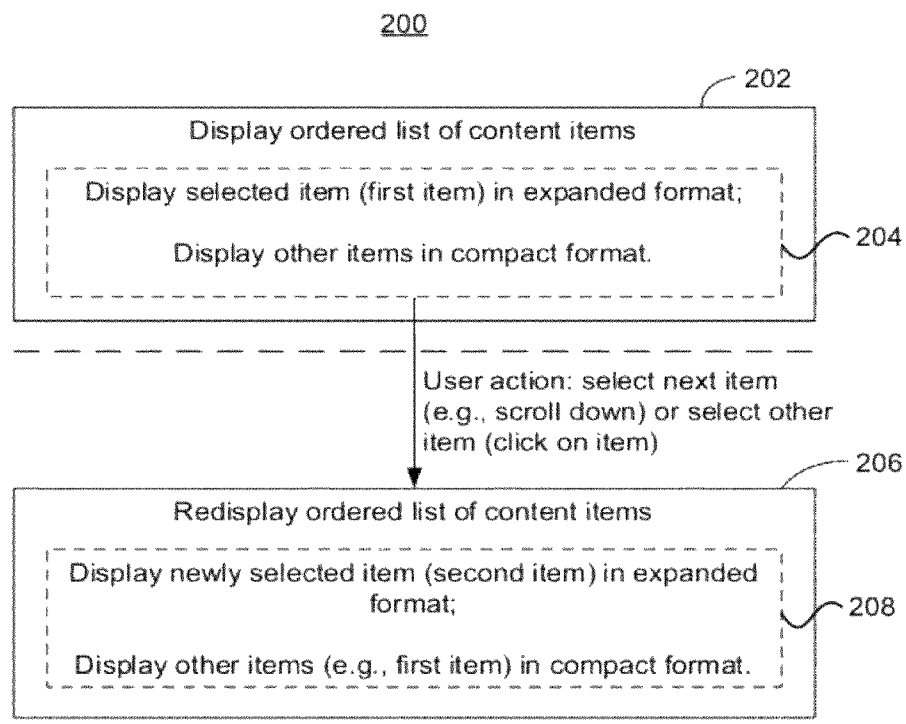
FIGS. 2A-2D are flow diagrams illustrating processes for presenting content items to a user, in accordance with some embodiments.

FIG. 2A is a flow diagram illustrating a process 200 for presenting content items to a user, in accordance with some embodiments. Process 200 occurs at a client device, on a client application that permits the user to interact with server system 104 via feed reader user interface 116. User interface 116 displays an ordered list of content items (202). The content items are specified in content feeds to which the user has subscribed. A selected first item is displayed in expanded format, and other items are displayed in compact format (204). FIG. 3B depicts an exemplary schematic screen shot of a user interface showing a first item, in an ordered list of content items, in expanded format and the other items in a compact format. In one embodiment, the compact format includes the publication source, headline, and timestamp associated with each item, with each item presented in a single line. In another embodiment, the compact format further includes a snippet (a small portion) of the content, also displayed on the single line. In an embodiment, the expanded format displays the same information as the compact format on a first line of the expanded format. In addition, the expanded format displays the title (sometimes called the headline) and source of the content on subsequent lines, in a larger font than the font used on the first line, and displays some or all of the content below the title and source. In other embodiments, the expanded format may include additional information associated with the content item. For example, a content item displayed in the expanded format may include a link to the full content associated with the content item. The link includes the URL of a web page or other document that contains the full content of the content item.

A user may select a next item (second item), for example by scrolling down the list, or may select another item (second item), for example by clicking on it. In response, the ordered list is redisplayed (206). The newly selected second item is displayed in expanded format, while other items, such as the first item, are displayed in compact format (208). FIG. 3C depicts an exemplary schematic screen shot of a user interface showing a second item in expanded format while the first item and other items are displayed in compact format.

Figure 2B:
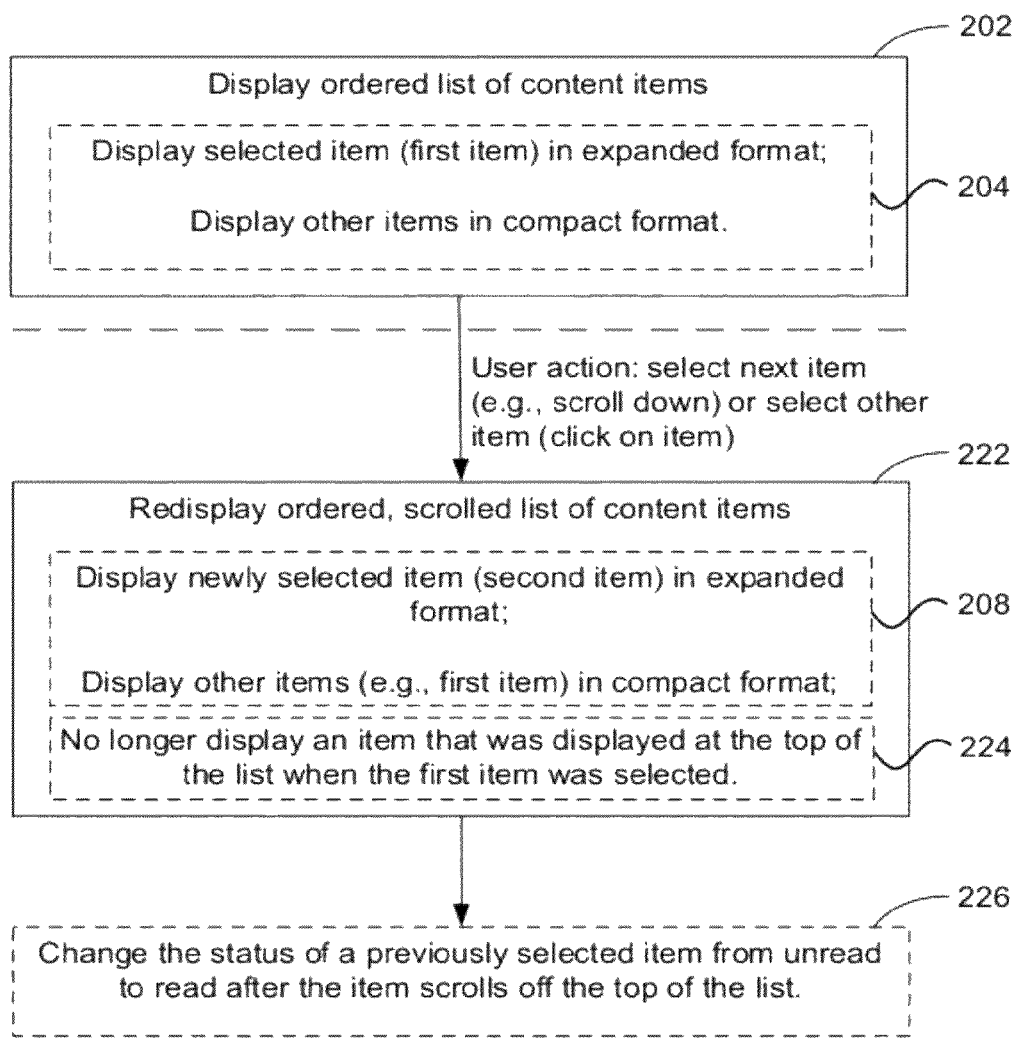

FIG. 2B is a flow diagram illustrating a process 220 for presenting content items to a user, in accordance with some embodiments. An ordered list of contents items is displayed with a selected first item in expanded format and other items in compact format, as described above (202, 204). When a user selects a second item, the ordered list is redisplayed (222). If the user has selected a second item by scrolling down the list, the redisplayed list is scrolled appropriately. The newly selected item is displayed in expanded format, while other items, such as the first item, are displayed in compact format (208). If the user has scrolled down the list, one or more items previously displayed at the top of the list when the first item was selected are no longer displayed (224). In some embodiments, the status of a previously selected item is changed from unread to read when the item scrolls off the top of the displayed list (226). More specifically, when an item that has been viewed in expanded format scrolls off the top of the display list, the client sends a message to the server system identifying the content item to be marked as read, and the server system then updates the status of the content item accordingly.

As discussed below with reference to FIG. 2D, in some other embodiments, content items are marked as read when they are displayed in expanded format. Alternatively, content items are marked as read when they are selected, regardless of whether they are displayed in expanded or compact format. Furthermore, in some embodiments, content items that have been marked as read, which have not yet been scrolled off the displayed list, are displayed in a manner that is distinct from the display of unread items. For example, one or more portions of the displayed text (e.g., the displayed title or headline) of items marked as read may be displayed in bold text while corresponding portions of unread items may be displayed using non-bold text. In another example, unread items are displayed with a first color scheme while items marked as read are displayed in a second color scheme that differs from the first scheme in the saturation, hue, and/or brightness of the color or colors used.

Figure 2C:
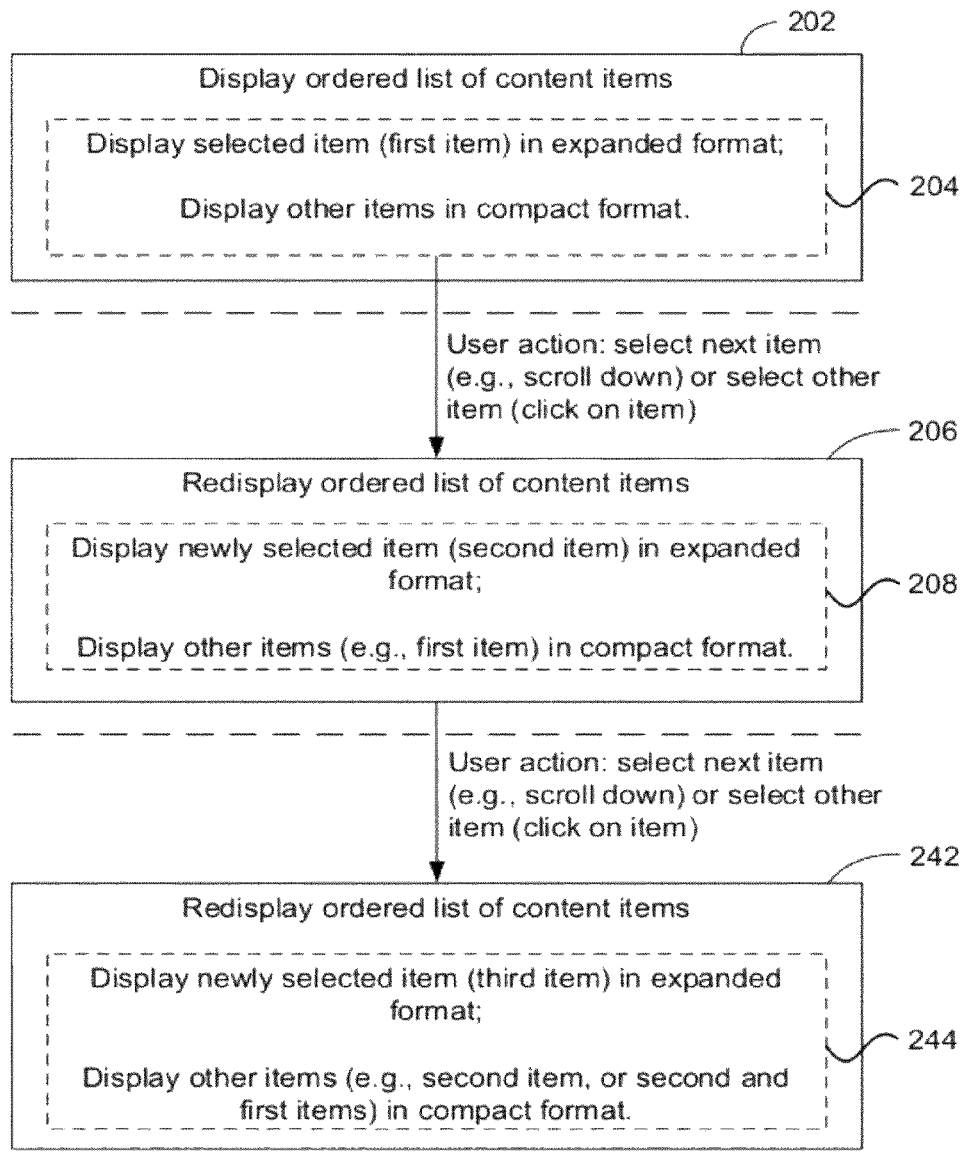

FIG. 2C is a flow diagram illustrating a process 240 for presenting content items to a user, in accordance with some embodiments. Process 240 begins with operations 202-208, described above with regards to FIG. 2A. After operation 208, the displayed ordered list includes a newly selected second item displayed in expanded format and other items, such as the previously selected first item, displayed in compact format. A user may select a next item (third item), for example by scrolling down the list, or may select another item (third item), for example by clicking on another item. In response, the ordered list is redisplayed (242). The newly selected third item is displayed in expanded format, while other items, such as the second and first items, are displayed in compact format (244). However, if the user scrolls through the list to select the third item, the first or second items may not be displayed (e.g., because they have been scrolled off the top or bottom of the displayed list of content items), depending on how far through the list the user scrolls.

Figure 2D:
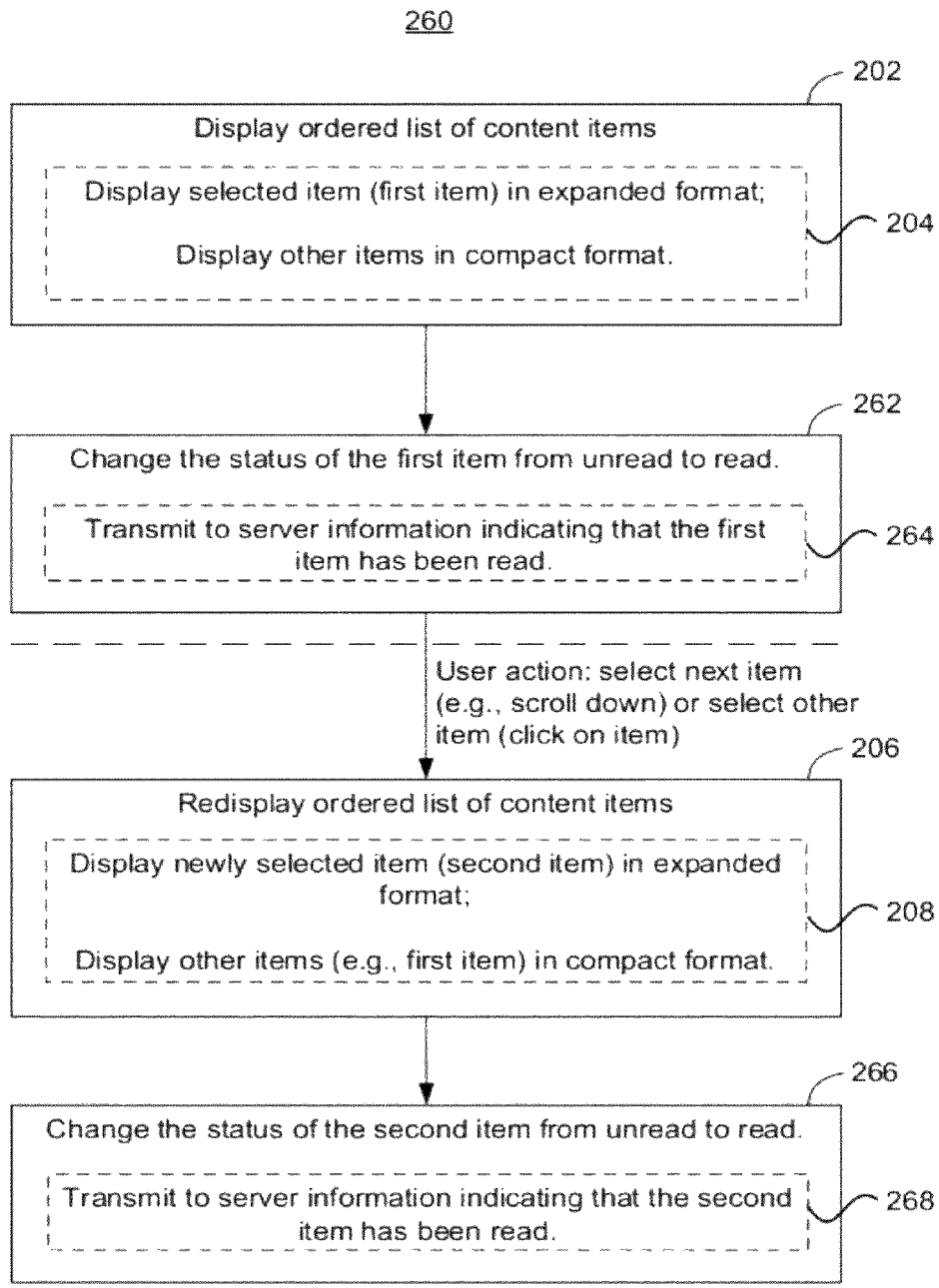

FIG. 2D is a flow diagram illustrating a process 260 for presenting content items to a user, in accordance with some embodiments. Operations 202 and 204 are performed as described above with regards to FIG. 2A. Selection of the first item results in the status of the first item being changed from unread to read (262). In some embodiments, the status is changed by transmitting information to server 108 indicating that the first item has been read (264). Server 108 then updates database 110 to reflect that the first item has been read by the user.

A user may select a next item (second item), for example by scrolling down the list, or may select another item (second item), for example by clicking on another item. In response, the ordered list is redisplayed (206). The newly selected second item is displayed in expanded format, while other items, such as the first item, are displayed in compact format (208). Selection of the second item results in the status of the second item being changed from unread to read (266). In some embodiments, the status is changed by transmitting information to server 108 indicating that the second item has been read (268). Server 108 then updates database 110 to reflect that the second item has been read by the user.

Figure 3A:
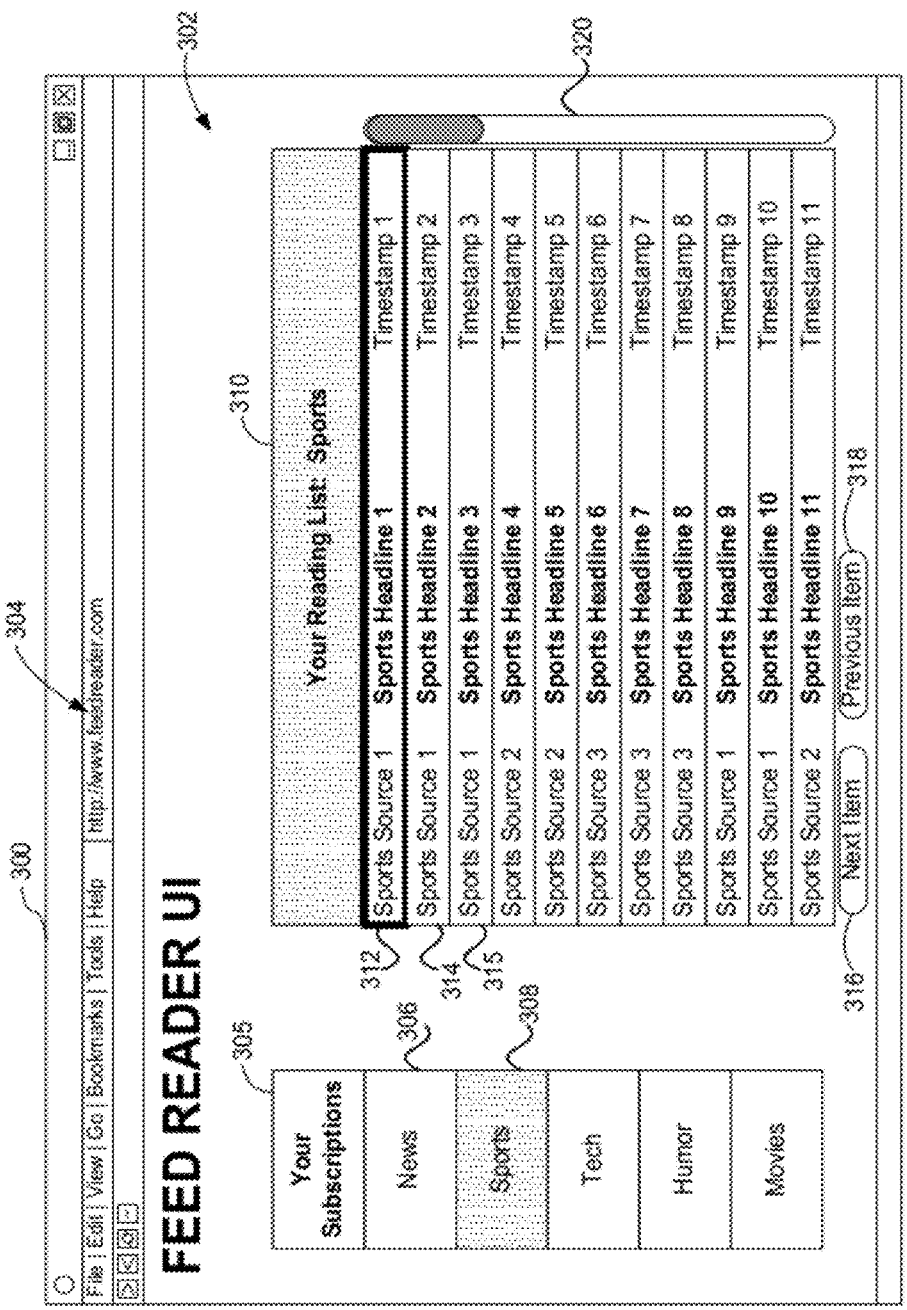
FIGS. 3A-3D are schematic screenshots of the user interface of a content feed reader in accordance with some embodiments.
Figure 3B:
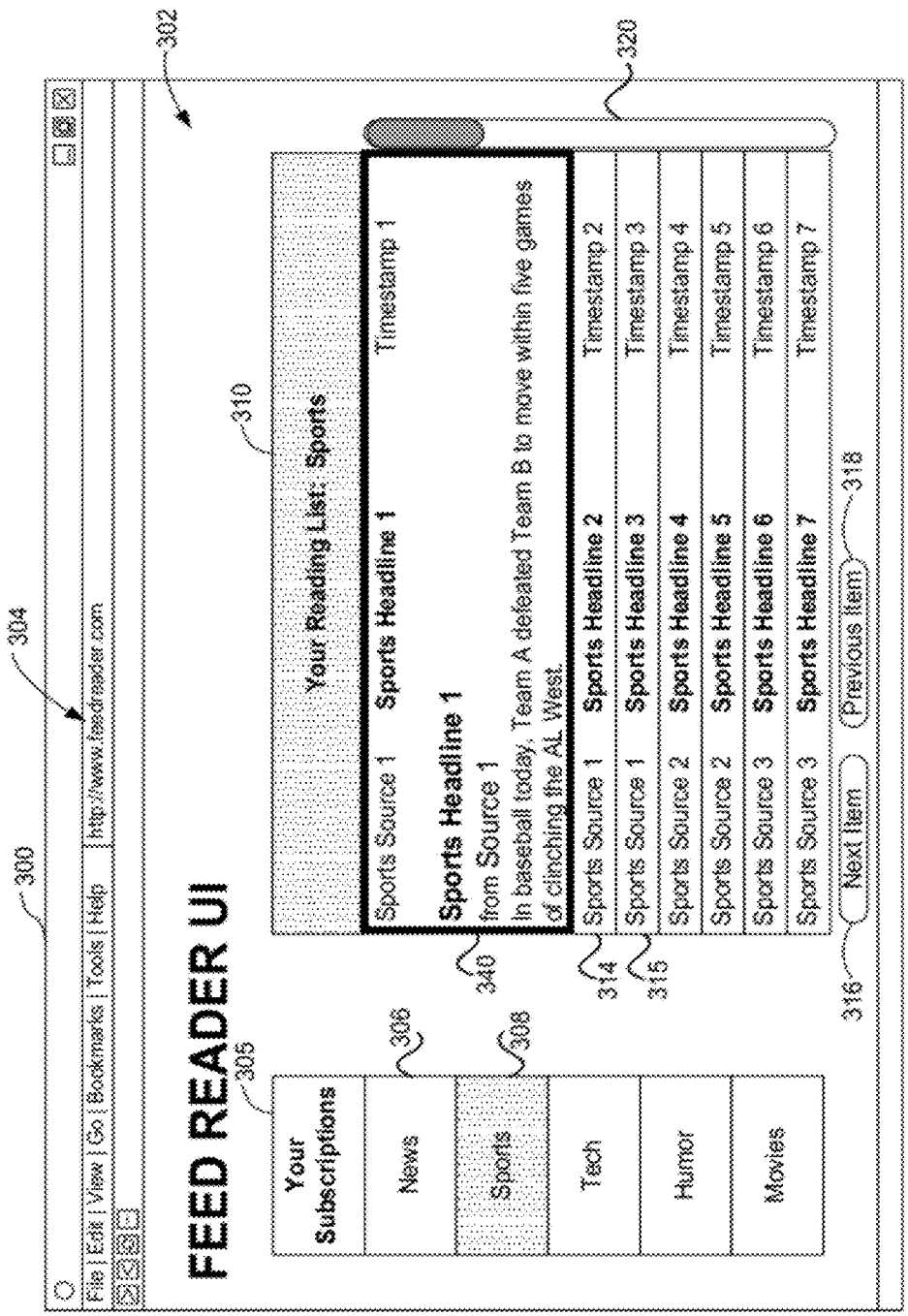
Figure 3C:
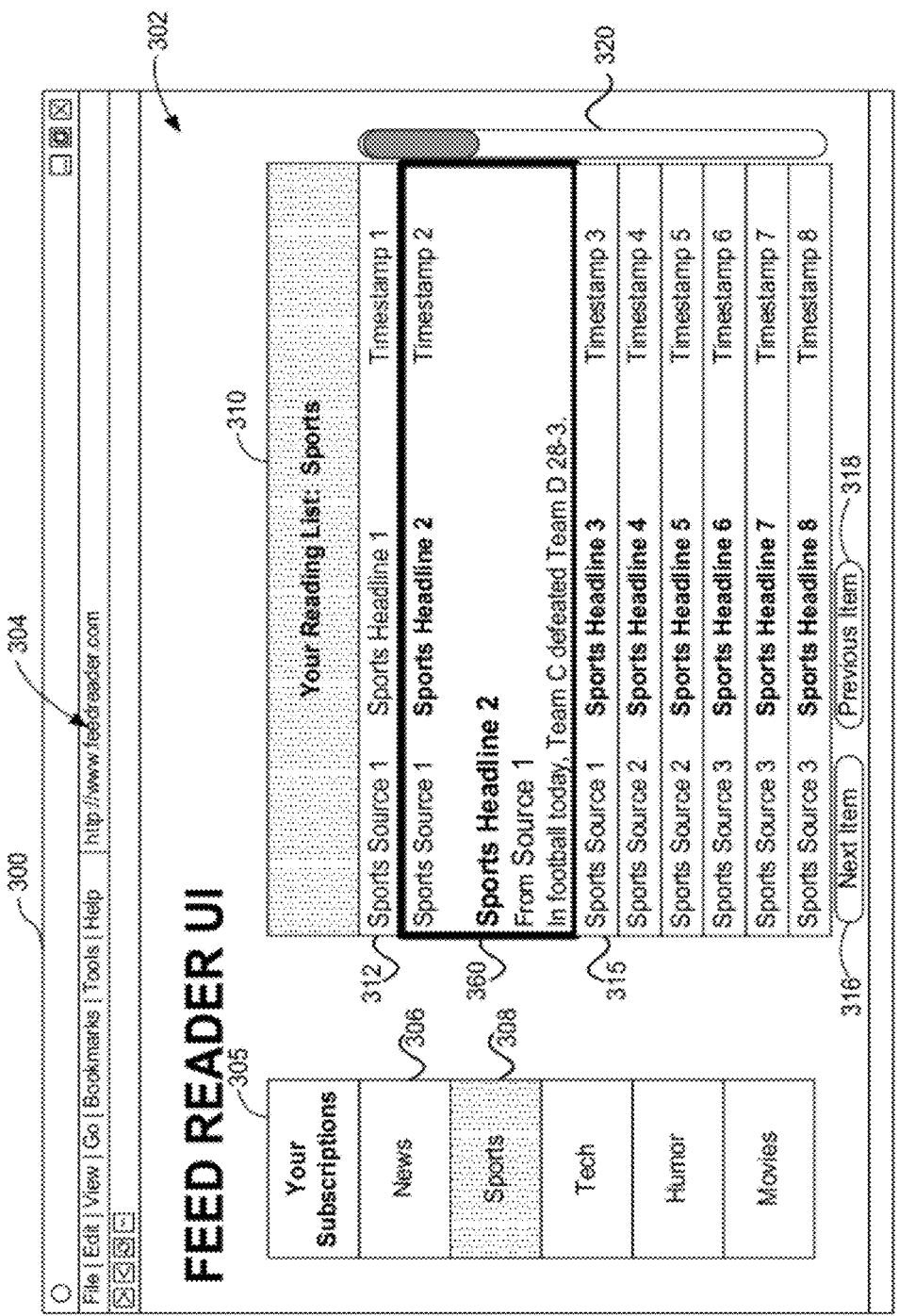

FIG. 3A is a schematic screenshot of a web browser's user interface 300 (sometimes hereinafter called the web browser for convenience), presenting a web page that displays a feed reader user interface 302, in accordance with some embodiments. The web browser 300 can be any type of browser application that permits a user to display and interact with web pages or other documents or information. The web browser's user interface includes a URL field 304 for entering the URL of any web page that a user wants to display, as well as for displaying the URL of the web page currently being displayed. The user may access a web page displaying a feed reader's user interface 302 by entering in the URL field 304 the URL associated with feed reader user interface 302.

Feed reader user interface 302 includes a list 305 of labels, also referred to as folders, associated with content feeds to which a user has subscribed. Exemplary labels shown in FIG. 3A include "News" 306 and "Sports" 308. The labels or folder names may be user defined names. User interface 302 also includes an ordered list 310 of content items associated with a selected label. For example, in FIG. 3A, the "Sports" label 308 has been selected by the user, as indicated by a shaded background. In this example, ordered list 310 includes items 312, 314, and 315. In some embodiments, items in ordered list 310 are ordered according to timestamps associated with the items. In some other embodiments, items in ordered list 310 are ordered in accordance with a score that takes into account both the content of the items and the timestamps of the items.

A user may select a different label, for example by clicking on a different label. If a user selected the "News" label 306, ordered list 310 would display content items associated with "News" label 306. Also, user interface 302 would indicate that the "News" label 306 was selected by displaying it with a shaded background. In this example, the background for "Sports" label 308 would no longer be shaded after the user selected "News" label 306.

In FIG. 3A, all items in ordered list 310, including items 312, 314, and 315, are displayed in compact format. In this embodiment, compact format includes the source, headline, and timestamp for each item, displayed in a single line. For example, the compact format display for item 312 includes "Sports Source 1," "Sports Headline 1," and "Timestamp 1," all displayed on the same line of ordered list 310. In other embodiments, compact format might include additional information. For example, a brief portion of the content could be displayed next to the headline.

User interface 302 shows that an item in ordered list 310 is selected by displaying that item with a bold border. In FIG. 3A, item 312 is selected, as indicated by its bold border. Items 314 and 315 are not selected, as indicated by their narrow borders. In other embodiments, a selected item may have a border with a different color from that of other items (e.g., a thick blue border for the selected item and a gray or thin black border for the unselected items). A user may select another item (second item) by clicking on "Next Item" button 316 or "Previous Item" button 318, by clicking directly on another item, or by scrolling through ordered list 310 using scrollbar 320 and then clicking on another item. For example, in FIG. 3A, a user could select item 314 by clicking "Next Item" button 316 or by clicking directly on item 314. Item 314 then would be displayed with a bold border, and other items, such as item 312, would appear with narrow borders.

FIG. 3B is a schematic screenshot of a web browser 300 presenting a web page that displays a feed reader user interface 302, in accordance with some embodiments. As in FIG. 3A, user interface 302 includes a list 305 of labels associated with content feeds to which a user has subscribed and an ordered list 310 of content items associated with a selected label. However, a selected content item 340 is displayed in expanded format, while other content items, such as a second item 314, are displayed in compact format. Item 340 corresponds to item 312 displayed in compact format in FIG. 3A. In an embodiment, the expanded format displays the same information as the compact format on a first line, such as the source, headline, and timestamp for each item. The headline then is displayed again in larger type on a second line, the source is displayed again on a third line, and the content is displayed on a fourth and subsequent lines as necessary. This embodiment of expanded format is illustrated by content item 340. In a different embodiment, the expanded format does not display the same information as the compact format on a first line; instead, it displays the headline and source in larger type than in the compact format, followed by the content on subsequent lines.

As discussed above in regards to FIG. 3A, a user may select another item (second item). For example, in FIG. 3B, the user might select item 314, by clicking on item 314 or by clicking "Next Item" button 316. FIG. 3C, a schematic screenshot of a web browser 300 presenting a web page that displays a feed reader user interface 302, shows the result of this user action according to an embodiment. The selected item 360 (corresponding to item 314 in compact format) appears in expanded format. Other items, including first item 312 (corresponding to item 340 in expanded format) are displayed in compact format.

In the example of FIGS. 3B and 3C, item 360 is not as large as item 340: it has only one line of content as opposed to two. Therefore, the ordered list 310 in FIG. 3B displays fewer items than the ordered list 310 in FIG. 3C: ordered list 310 in FIG. 3B displays seven items, while ordered list 310 in FIG. 3C displays eight items. In general, the number of items displayed in ordered list 310 will vary depending on the size in expanded format of the selected item.

Figure 3D:
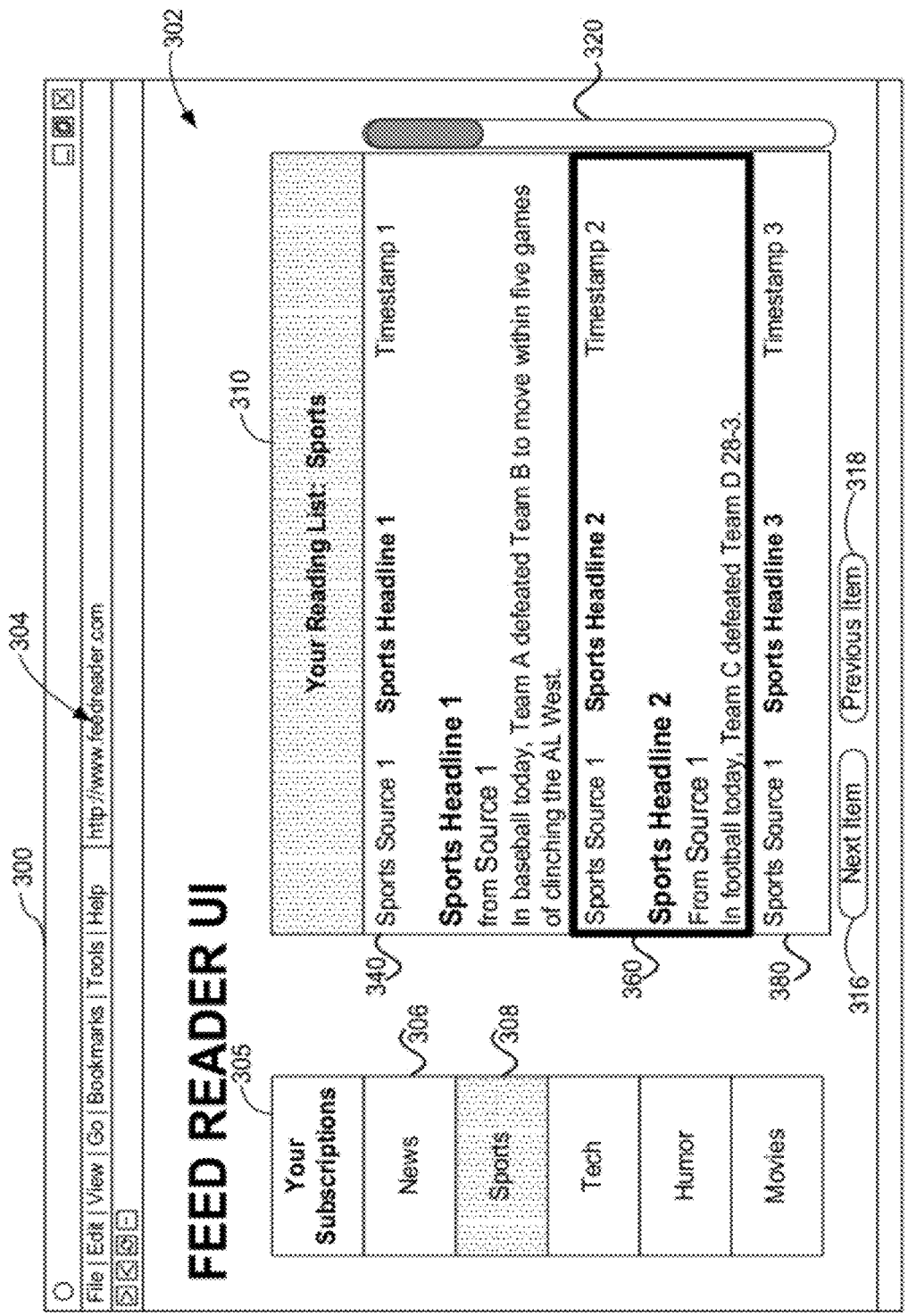

FIG. 3D is a schematic screenshot of a web browser 300 presenting a web page that displays a feed reader user interface 302, in accordance with some embodiments. As in FIGS. 3A-3C, user interface 302 includes a list 305 of labels associated with content feeds to which a user has subscribed and an ordered list 310 of content items associated with a selected label. However, all items in ordered list 310 are displayed in expanded format. Items 340 and 360 (corresponding respectively to items 312 and 314 in compact format) are displayed in their entirety. Only the top portion of item 380 (corresponding to item 315 in compact format) is displayed, because there is not enough space to display the entire item in expanded format. Because the size of each item in expanded format varies, depending for example on the amount of content, the number of displayed items will vary in general.

Some, but not necessarily all, content items displayed in expanded format include a link to the full content associated with those content items. The link may be activated by a user clicking on the headline in the content item, or by clicking on a link icon (not shown in FIGS. 3A-3D) displayed in the expanded format of a respective content item. Activation of the link typically causes the browser to open a new browser window or tab and to download and display the document (if any) located at the location (e.g., URL) specified by the link.

Although not shown in FIGS. 3A-3D, the feed reader user interface will typically include icons, menu items or the like for reviewing and managing the user's content feed subscriptions, including removing and adding content feed subscriptions, and optionally labeling a respective content feed subscription with one or more user defined labels (or, alternately, assigning the respective content feed subscription to one or more user defined folders).

Figure 4A:
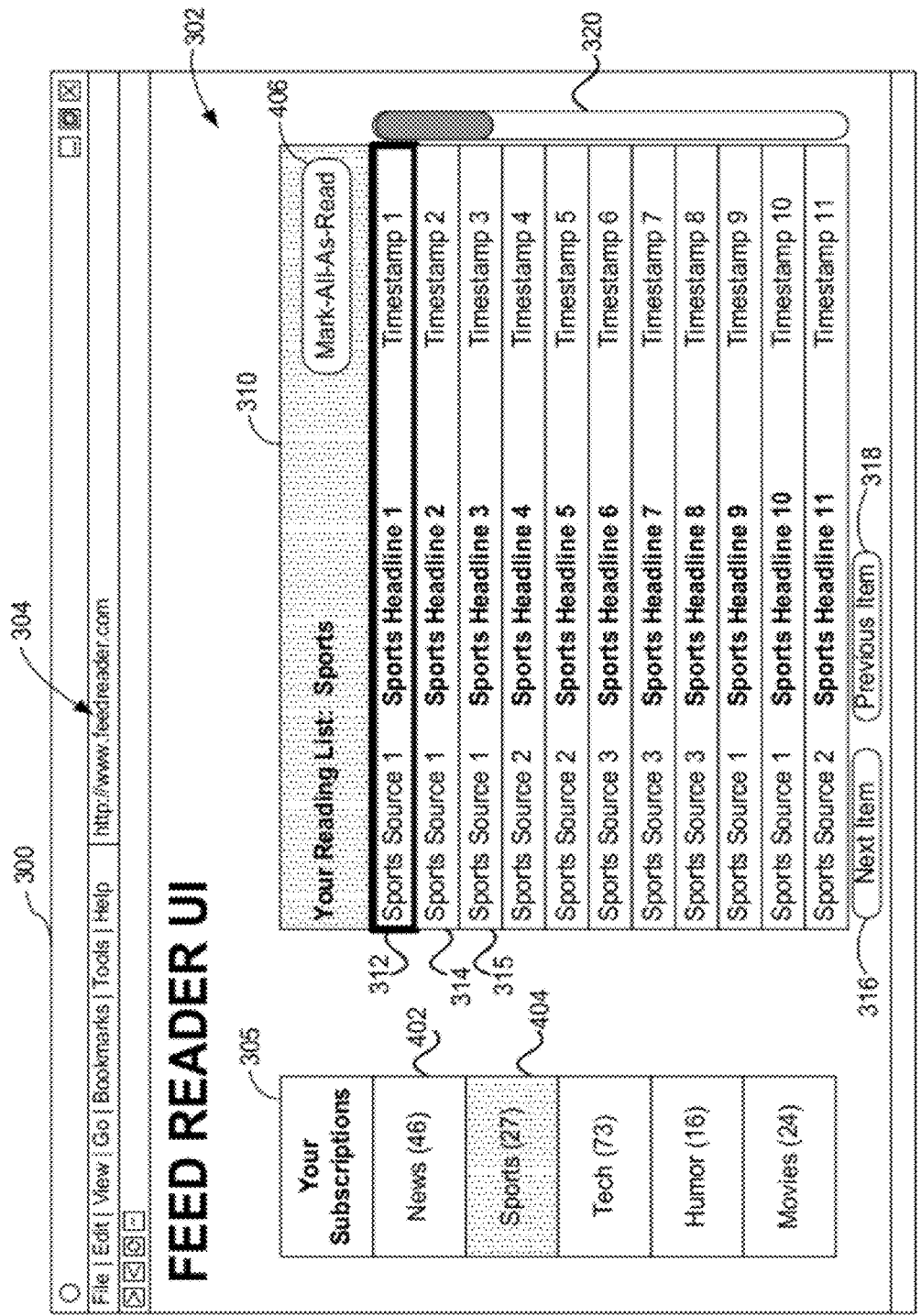
FIGS. 4A-4C are schematic screenshots of the user interface of a content feed reader in accordance with some embodiments.

In some embodiments, the feed reader user interface 302 displays a count of unread items in a feed stream. For example, in FIGS. 4A-4C, unread item counts are displayed in the list 305 of labels, in accordance with some embodiments. In FIG. 4A, "News" label 402, which corresponds to label 306 in FIGS. 3A-3D, indicates that there are 46 unread items in the "News" feed stream. Similarly, "Sports" label 404, which corresponds to label 308 in FIGS. 3A-3D, indicates that there are 27 unread items in the "Sports" feed stream. In this example, the number of unread items is specific to a particular user: multiple users may subscribe to the same feed stream, and separate counts of unread items will be maintained for each subscribing user.

Figure 4B:
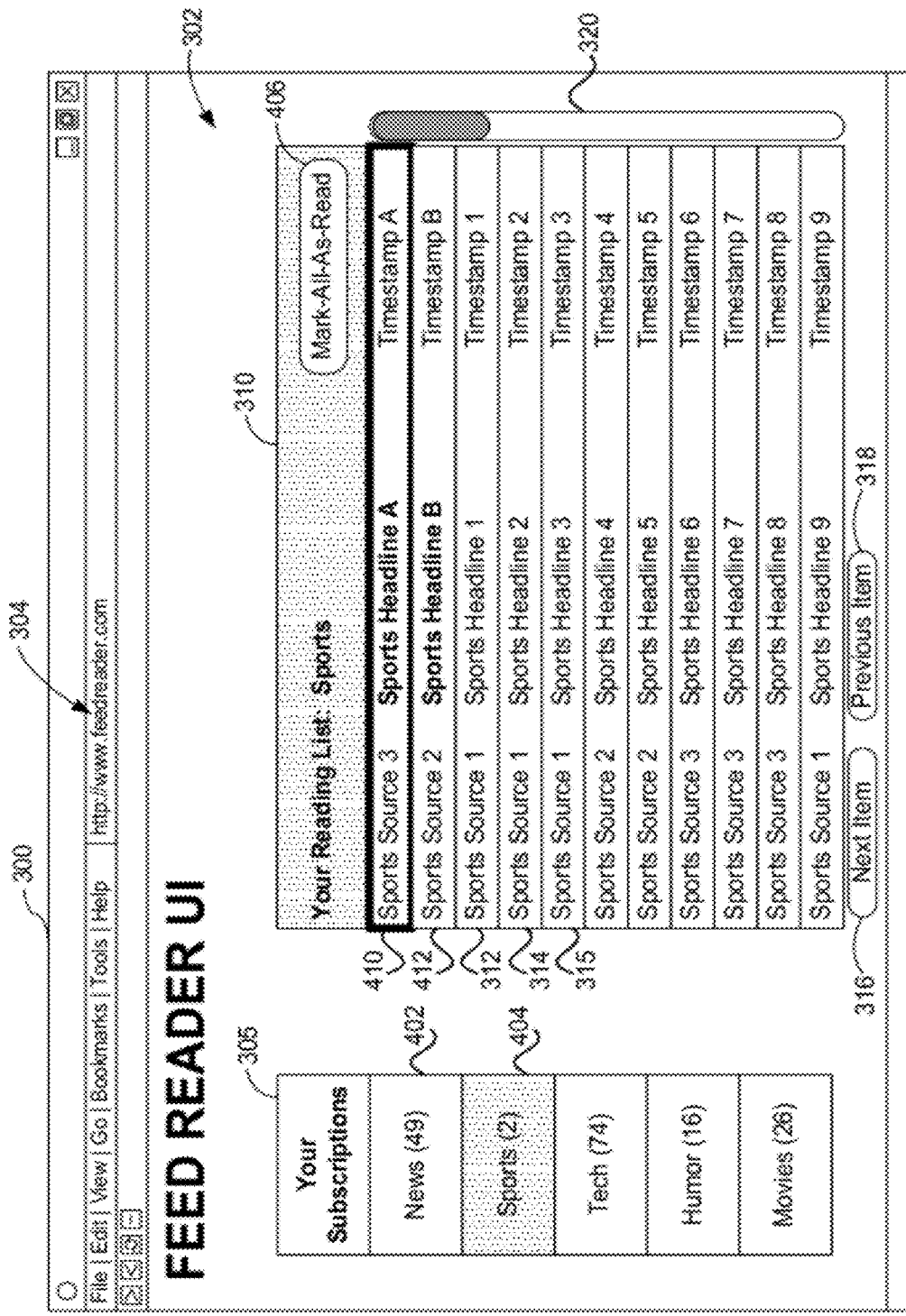
Figure 4C:
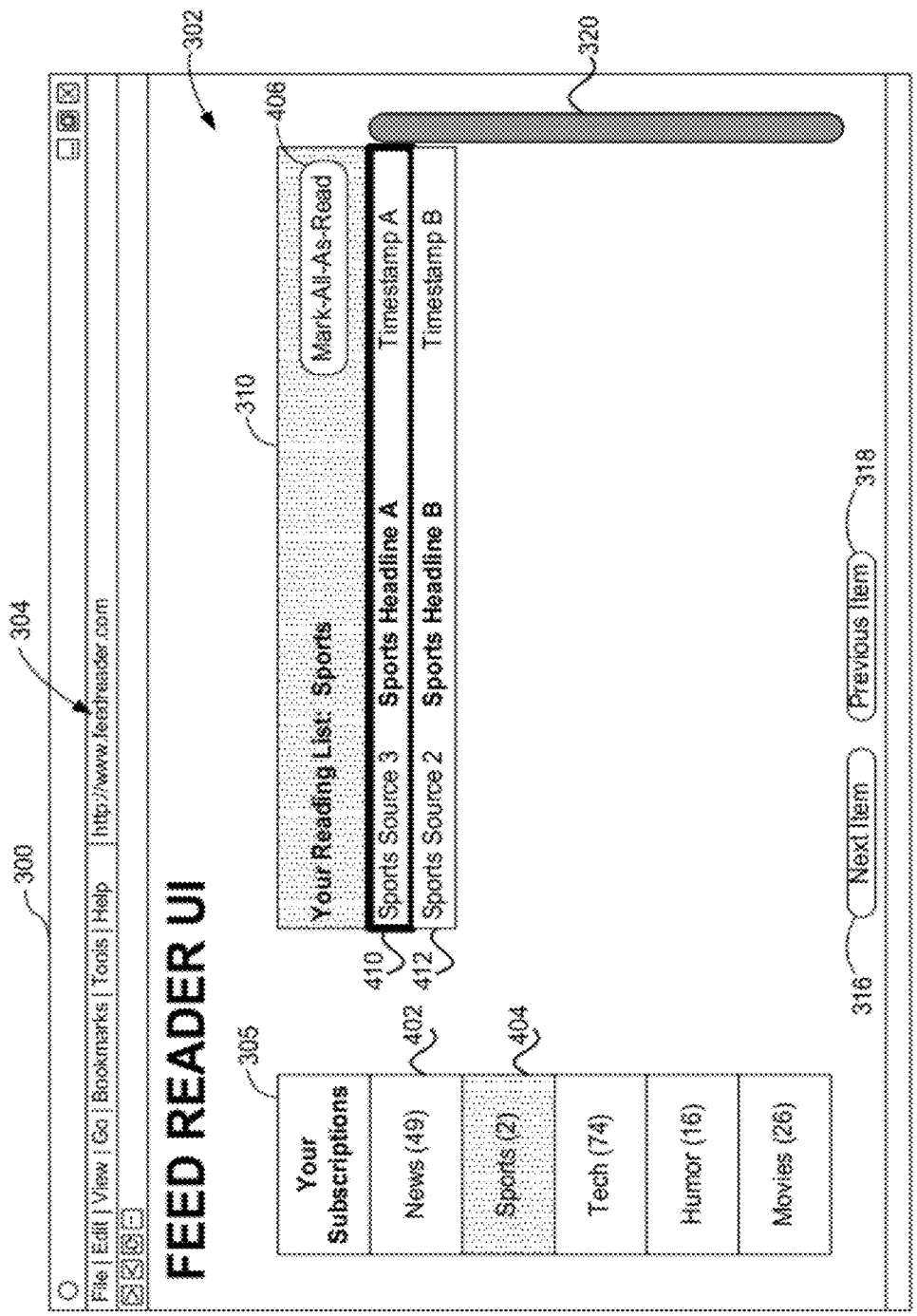

In some embodiments, the feed reader user interface 302 includes a "Mark-All-As-Read" icon 406 associated with a specified feed stream. For example, the icon 406 in FIGS. 4A-4C is associated with the "Sports" feed stream referenced by label 404, which is the currently selected feed stream in the feed reader user interface 302. Upon detecting selection by the user of the "Mark-All-As-Read" icon 406, for example by clicking on the icon 406 with a mouse or other selection device, a time of selection of the icon 406 is recorded. All items in the relevant feed stream—"Sports" in this example—that have timestamps dated prior to the recorded time of selection of the icon 406 are considered to have been read. In some embodiments, the time of selection is a timestamp of the most recent item in the specified feed stream that was displayed or available at the client to be displayed prior to when the user selected the "Mark-All-As-Read" icon 406.

In some alternate embodiments, a feed reader user interface includes a "Mark-All-As-Read" icon associated with all feed streams to which a user subscribes (not shown). Upon selection of this icon, all items in all feed streams to which the user subscribes that have timestamps dated prior to a recorded time of selection of the icon are considered to have been read. In some embodiments, the time of selection is a timestamp of the most recent item in all feeds streams to which the user subscribes that was displayed or available at the client to be displayed prior to when the user selected the "Mark-All-As-Read" icon.

In some embodiments, unread items are displayed in a visually distinctive format from items marked as read. For example, unread items are displayed in bold text while items marked as read are displayed in non-bold text. In another example, unread items are displayed with a first color scheme while items marked as read are displayed in a second color scheme that differs from the first color scheme in the saturation, hue, and/or brightness of the color or colors used, such that the first color scheme is visually distinctive from the second color scheme.

FIG. 4B illustrates the display of unread and marked-as-read items in visually distinctive formats in accordance with some embodiments. The list of items 310 displayed in FIG. 4B results from user activation of the "Mark-All-As-Read" icon 406 in FIG. 4A, followed by the arrival of two new "Sports" items 410 and 412. The two new items 410 and 412 thus have associated timestamps dated after the recorded time of selection of the "Mark-All-As-Read" icon 406. The older items (previously displayed in FIG. 4A), such as items 312, 314, and 315, have associated timestamps dated prior to the recorded time of selection of the "Mark-All-As-Read" icon 406. The two new items 410 and 412 are displayed with bold headlines, thereby visually distinguishing them from the older items.

In FIG. 4B, the count of unread items displayed in the "Sports" label 404 has been updated to reflect activation of the "Mark-All-As-Read" icon 406. The "Sports" label 404 now shows that there are two unread items in the "Sports" feed stream, corresponding to the two new items 410 and 412 that arrived subsequent to selection of the icon 406. The counts of unread items displayed for other feed stream labels (e.g., "News" 402) have increased with respect to the counts displayed in FIG. 4A, to reflect the arrival of new items in those feed streams.

In some embodiments, the feed reader user interface does not display items that have been marked as read; only unread items are displayed. For example, in FIG. 4C the feed reader user interface 302 only displays the new items 410 and 412 that have associated timestamps dated after the recorded time of selection of the "Mark-All-As-Read" icon 406. Items that have timestamps dated prior to the recorded time of selection of the "Mark-All-As-Read" icon 406 (e.g., items 312, 314, and 315) are not displayed.

Attention is now directed to methods of providing content.

Figure 5A:
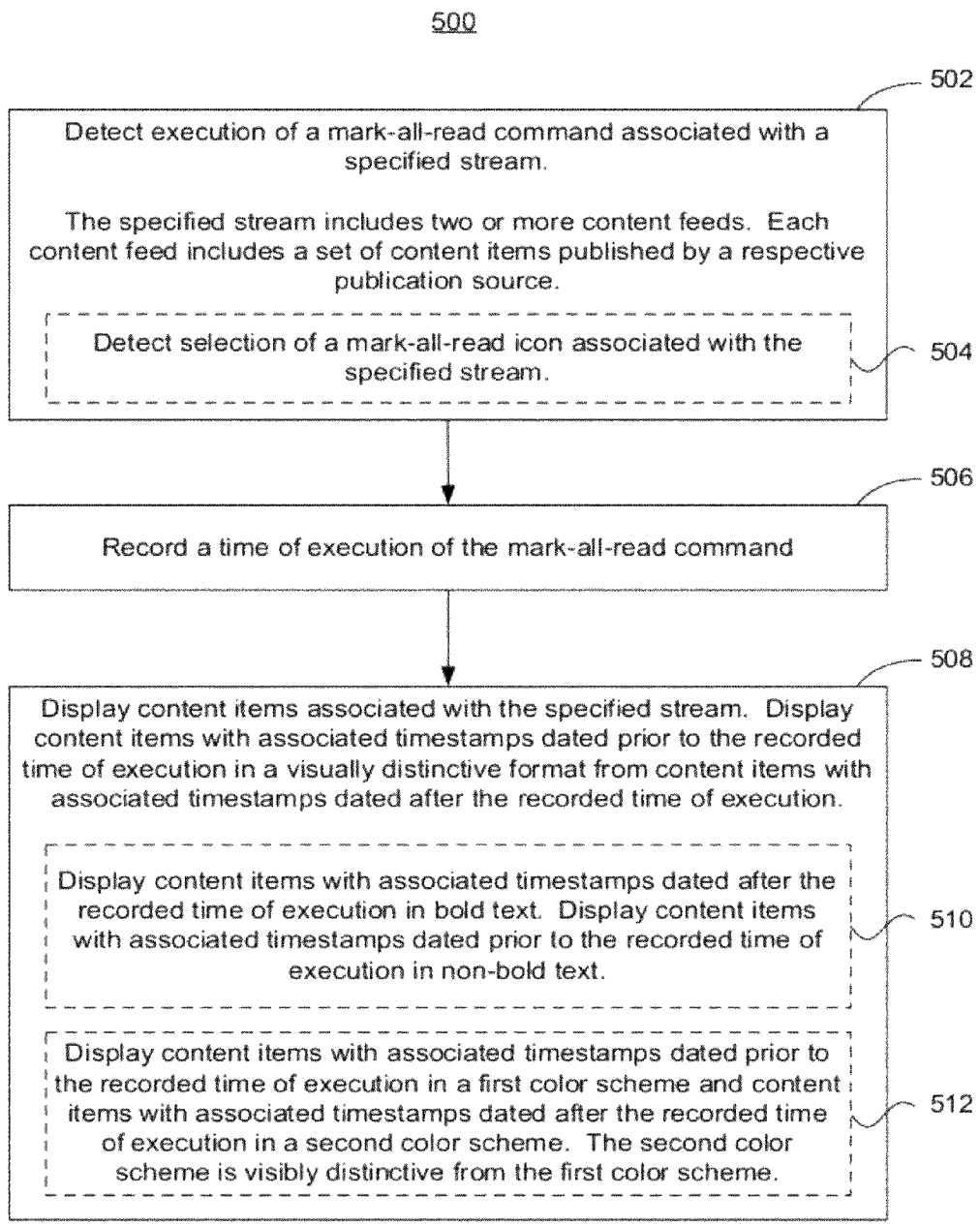
FIGS. 5A and 5B are flow diagrams illustrating methods of providing content in accordance with some embodiments.

FIG. 5A is a flow diagram illustrating a method 500 of providing content in accordance with some embodiments. In some embodiments, the method 500 is performed at a client system (e.g., client system 102; FIG. 1).

Execution of a mark-all-read command associated with a specified stream is detected (502). The specified stream includes two or more content feeds. Each content feed includes a set of content items published by a respective publication source. In some embodiments, the specified stream includes two or more constituent streams, at least one of which includes two or more content feeds. In some embodiments, detecting execution of the mark-all-read command includes detecting (504) selection of a mark-all-read icon (e.g., icon 406) associated with the specified stream (e.g., the "Sports" stream represented by label 404).

A time of execution of the mark-all-read command is recorded (506). For example, a time of selection of the "Mark-All-As-Read" icon 406 is recorded. In some embodiments, the time of execution is a timestamp of the most recent item in the specified stream that was displayed or available at the client to be displayed prior to execution of the mark-all-read command.

Content items associated with the specified stream are displayed (508). Content items with associated timestamps dated prior to the recorded time of execution are displayed in a visually distinctive format from content items with associated timestamps dated after the recorded time of execution.

In some embodiments, content items with associated timestamps dated after the recorded time of execution are displayed in bold text and content items with associated timestamps dated prior to the recorded time of execution are displayed in non-bold text (510). For example, in FIG. 4B, items 410 and 412 have timestamps dated after the recorded time of selection of the icon 416 and are displayed with bold headlines. Other items (e.g., 312, 314, and 315) have timestamps dated prior to the recorded time of selection of the icon 416 and are displayed with non-bold headlines. In some embodiments, content items with associated timestamps dated prior to the recorded time of execution are displayed in a first color scheme and content items with associated timestamps dated after the time of execution are displayed in a second color scheme (512), wherein the second color scheme is visibly distinctive from the first color scheme. For example, the second color scheme may differ from the first color scheme in the saturation, hue, and/or brightness of the color or colors used.

The method 500 thus provides a way of visually distinguishing unread items from items marked as read. In some embodiments, however, a feed reader user interface will not display items marked as read.

Figure 5B:
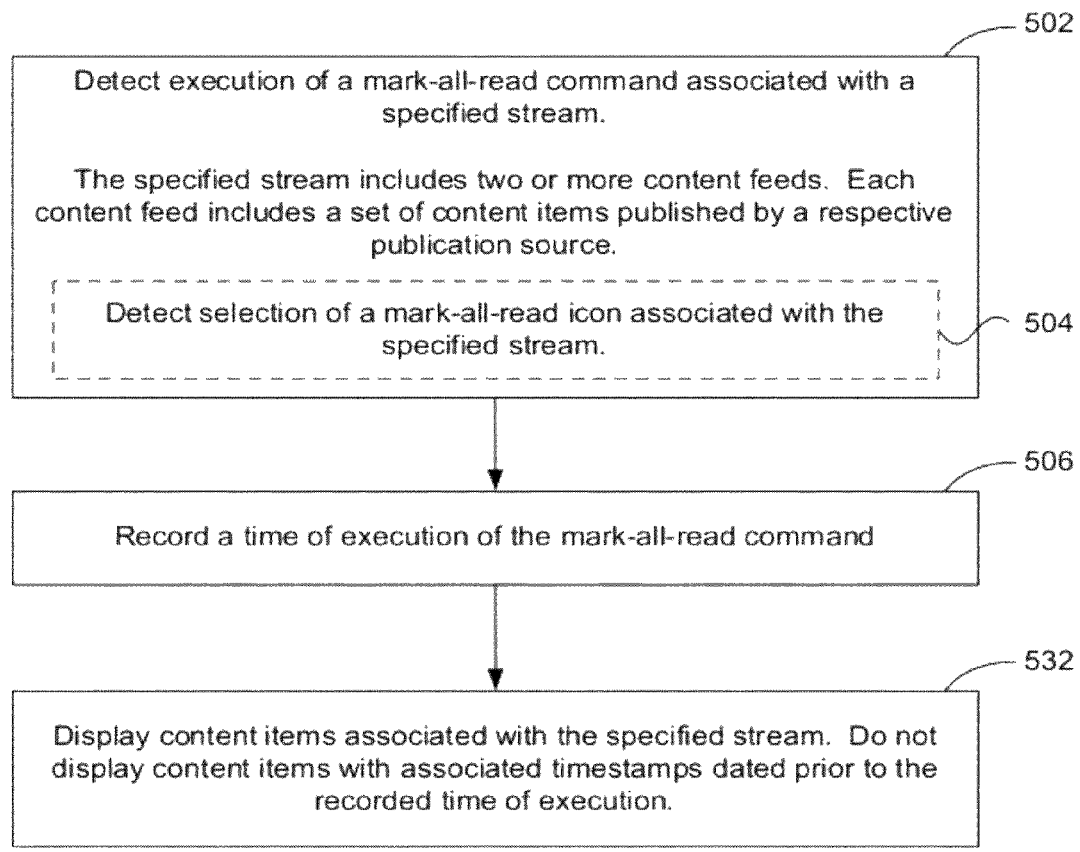

FIG. 5B is a flow diagram illustrating a method 530 of providing content in accordance with some embodiments. In some embodiments, the method 530 is performed at a client system (e.g., client system 102; FIG. 1). Operations 502 and 506 are performed as described above with regard to FIG. 5A. In some embodiments, operation 504 is performed as described above with regard to FIG. 5A.

Content items associated with the specified stream are displayed (532). No content items with associated timestamps dated prior to the recorded time of execution are displayed. For example, in FIG. 4C, only items 410 and 412 are displayed, because only items 410 and 412 have timestamps dated after the recorded time of selection of the "Mark-All-As-Read" icon 406.

Attention is now directed to methods of serving content.

Figure 6A:
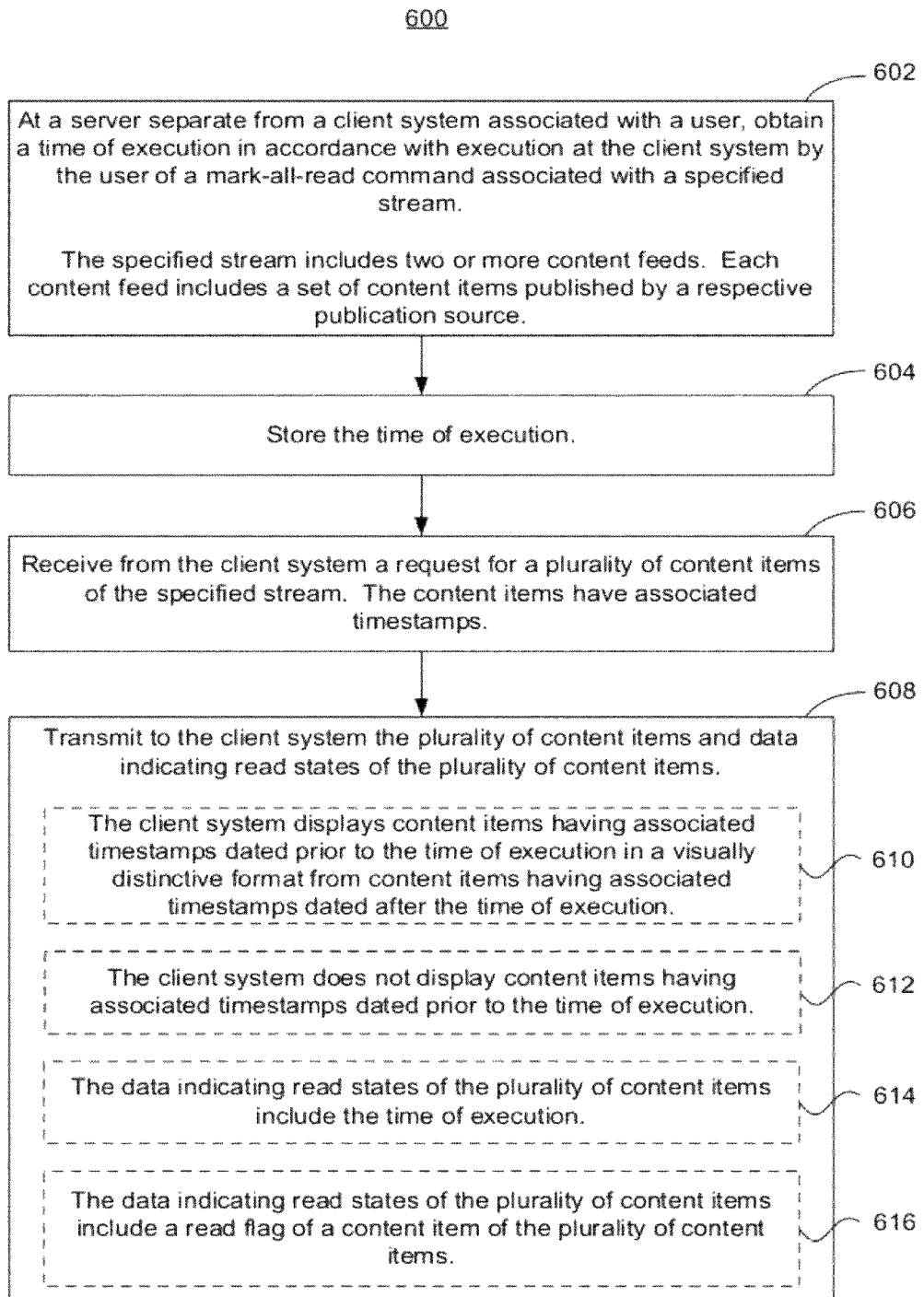
FIGS. 6A and 6B are flow diagrams illustrating methods of serving content items from content feeds to a plurality of users in accordance with some embodiments.

FIG. 6A is a flow diagram illustrating a method 600 of serving content items from content feeds to a plurality of users in accordance with some embodiments. The method 600 is performed at a server (e.g. server system 104; FIG. 1) separate from a client system (e.g., client system 102) associated with a user. A time of execution by the user of a mark-all-read command associated with a specified stream is obtained (602). The specified stream includes two or more content feeds. Each content feed includes a set of content items published by a respective publication source. In some embodiments, the specified stream includes two or more constituent streams, at least one of which includes two or more content feeds.

In some embodiments, the obtained time of execution by the user of the mark-all-read command corresponds to a recorded time of selection by the user of a mark-all-read icon (e.g., icon 406). For example, the server obtains a recorded time of execution from the client system, which transmits the recorded time of execution of the mark-all-read command to the server. In some embodiments, the client system transmits a message to the server indicating that the user has executed the mark-all-read command but not necessarily specifying the time of execution. The server then obtains the time of execution in accordance with a recorded time of receipt of the message. In some embodiments, the time of execution is a timestamp of the most recent item in the specified stream that was transmitted to the client system prior to detecting execution of the mark-all-read command, or that was made available for display at the client system prior to detecting execution of the mark-all-read command.

The time of execution is stored (604). For example, the server stores the time of execution in an entry 1168 (FIG. 11B) in a user subscription table 1150.

In some embodiments, in which the stream recursively includes other constituent streams, storing the time of execution involves identifying the constituent streams and storing the time of execution as timestamps in table entries (e.g., entries 1168) corresponding to the respective constituent streams. In some embodiments, identification of the constituent streams is performed to a predetermined depth of recursion. Storing timestamps for constituent streams assures that if a user subscribes to two streams (i.e., a first stream and a second stream) that share a common constituent stream, then execution of a mark-all-read command for the first stream will allow items from the common constituent stream to be displayed as having been read when displayed as part of the second stream.

The server receives (606) from the client system a request for a plurality of content items of the specified stream. The content items have associated timestamps. The request may be generated, for example, in response to a user logging in to the feed reader user interface 302 and selecting a label corresponding to the specified stream (e.g., "Sports" label 404).

The server transmits to the client system the plurality of content items and data indicating read states of the plurality of content items (608). In some embodiments, the client displays content items with associated timestamps dated prior to the time of execution in a visually distinctive format from content items with associated timestamps dated after the time of execution (610). In some embodiments, the client system does not display content items with associated timestamps dated prior to the time of execution (612).

In some embodiments, the data indicating read states of the plurality of content items include the time of execution of the mark-al-read command (614). In some embodiments, the data indicating read states of the plurality of content items include a read flag of a content item of the plurality of content items (616). The client system may use a respective content item's read flag and/or the time of execution of the mark-all-read command to determine whether to treat the respective content item as unread or read.

Figure 6B:
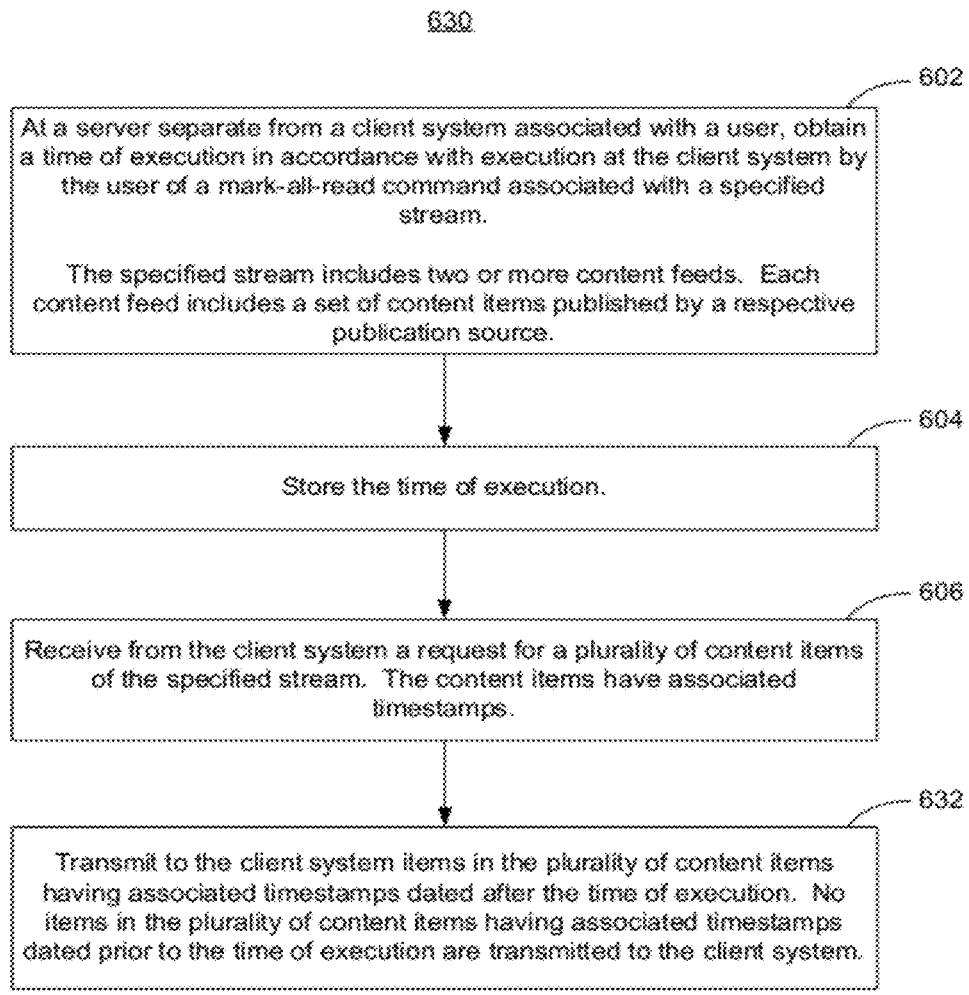

FIG. 6B is a flow diagram illustrating a method 630 of serving content items from content feeds to a plurality of users in accordance with some embodiments. Operations 602, 604, and 606 are performed as described above with regard to FIG. 6A. In response to receiving from the client system the request for a plurality of content items of the specified stream (606), the server transmits (632) to the client system items in the plurality of content items having associated timestamps dated after the time of execution. No content items in the plurality of content items with associated timestamps dated prior to the time of execution are transmitted to the client system.

Figure 7A:
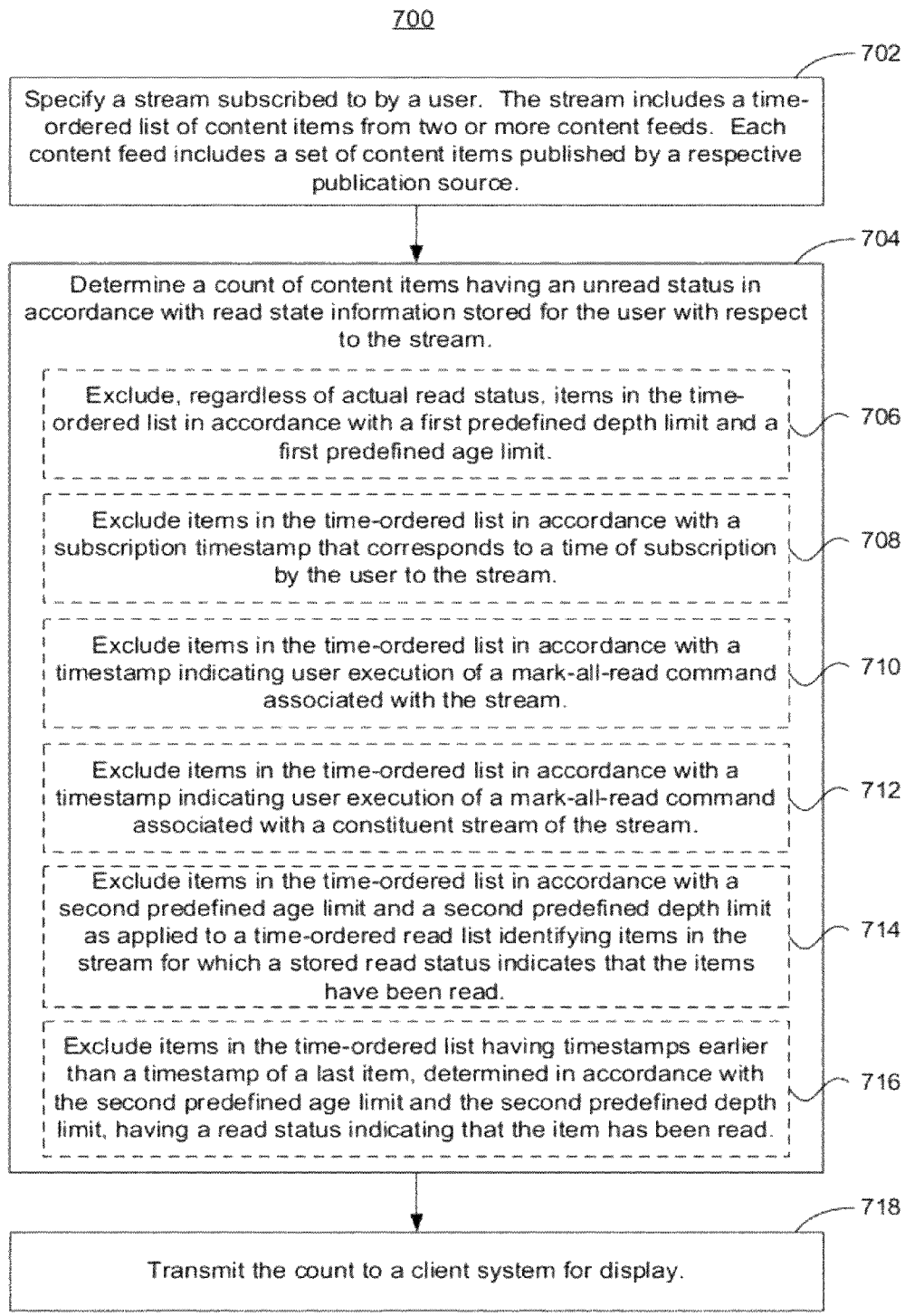
FIGS. 7A and 7B are flow diagrams illustrating methods of quantifying unread content items in accordance with some embodiments.

Attention is now directed to methods of quantifying unread content items. FIG. 7A is a flow diagram illustrating a method 700 of quantifying unread content items in accordance with some embodiments. The method 700 may be used, for example, to calculate the unread counts displayed in the list 305 of labels in FIG. 4A. In some embodiments, the method 700 is performed at a server (e.g. server system 104; FIG. 1) separate from a client system (e.g., client system 102) associated with a user.

A stream subscribed to by a user, for which unread content items are to be quantified, is specified (702). The stream includes a time-ordered list of content items from two or more content feeds. Each content feed includes a set of content items published by a respective publication source. In some embodiments, a respective content feed is a virtual stream.

A count of content items that have an unread status is determined (704) in accordance with read state information stored for the user with respect to the stream.

In some embodiments, the count excludes, regardless of actual read status, items in the time-ordered list in accordance with a first predefined depth limit and a first predefined age limit (706). For example, determining the count of content items with an unread status may include fetching all content items in each content feed that constitutes the stream, up to the first predefined depth limit or the first predefined age limit, whichever is reached first. In some embodiments, the first predefined depth limit and the first predefined age limit are applied to each content feed individually. In some other embodiments, the first predefined depth limit and the first predefined age limit are applied to the entire stream, instead of being applied to each constituent content feed individually.

Figure 8A:
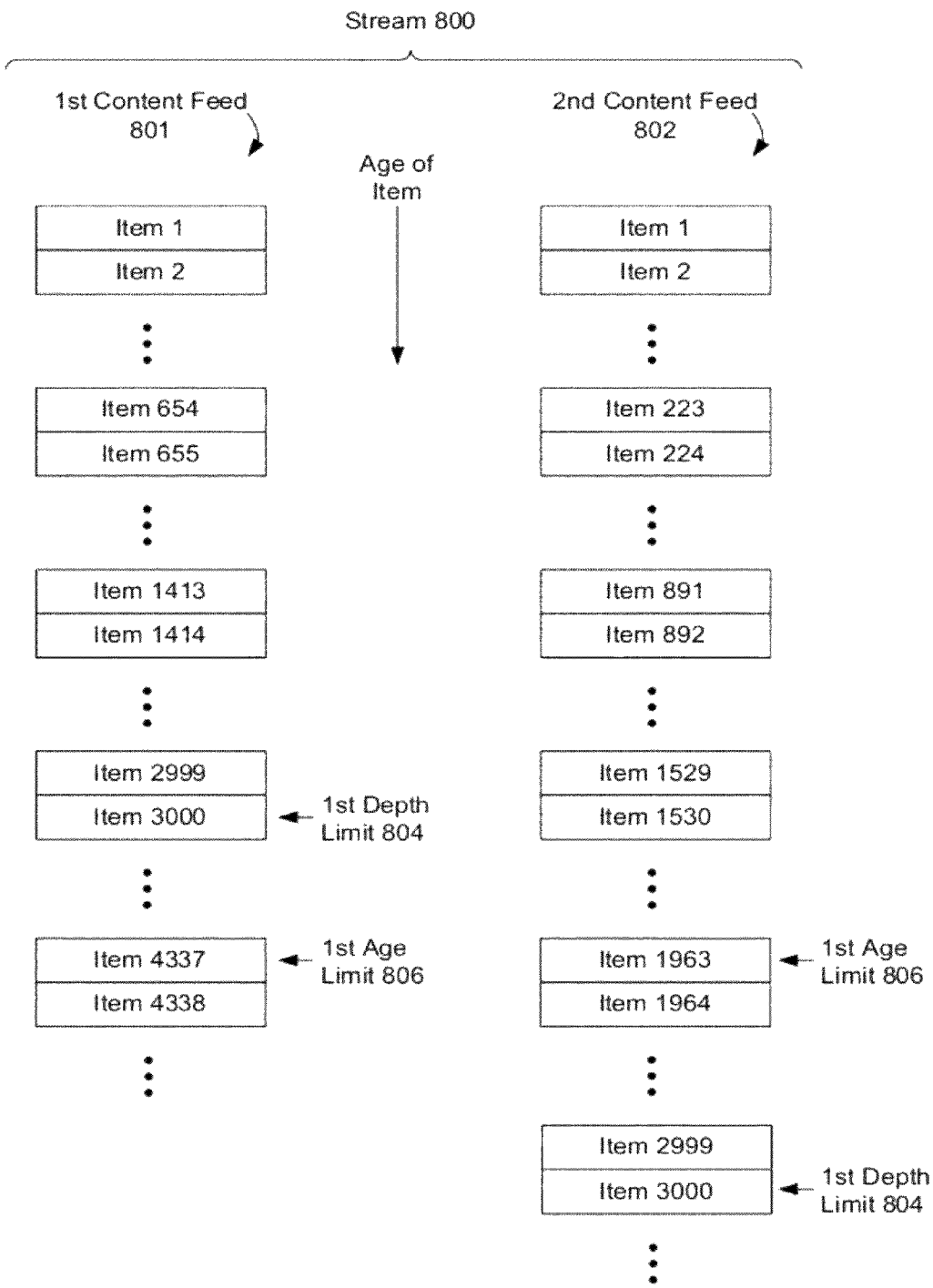

In an example, as illustrated in FIG. 8A, a stream 800 includes first 801 and second 802 constituent content feeds. The first predefined age limit 806 is 30 days and the first predefined depth limit 804 is 3000 content items. For the first constituent content feed 801, the first predefined depth limit 804 is reached prior to the first predefined age limit 806: item 3000 has a timestamp less than 30 days old. Therefore, items one through 3000 are fetched from the first constituent content feed 801. For the second constituent content feed 802, the first predefined age limit 806 is reached prior to the first predefined depth limit 804: item 1963 has a timestamp that is 30 days old, and item 3000 has a timestamp greater than 30 days old. Therefore, items one through 1963 are fetched from the second constituent content feed 802. A total of 4963 items are fetched from the two constituent content feeds 801 and 802. It remains to be determined how many of the 4963 fetched items are unread.

In some embodiments, the count excludes items in the time-ordered list in accordance with a subscription timestamp that corresponds to a time of subscription by the user to the stream (708). For example, when fetching content items in a respective content feed in the stream, no content items are fetched with timestamps earlier than a subscription timestamp associated with the user, regardless of the first predetermined age and depth limits. The unread count thus will not include items that predate the user's subscription to the stream. In another example, a small, predefined number of content items are fetched that have timestamps earlier than a subscription timestamp associated with the user. For example, the 10 items with timestamps dated immediately prior to the subscription timestamp are fetched.

Figure 8B:
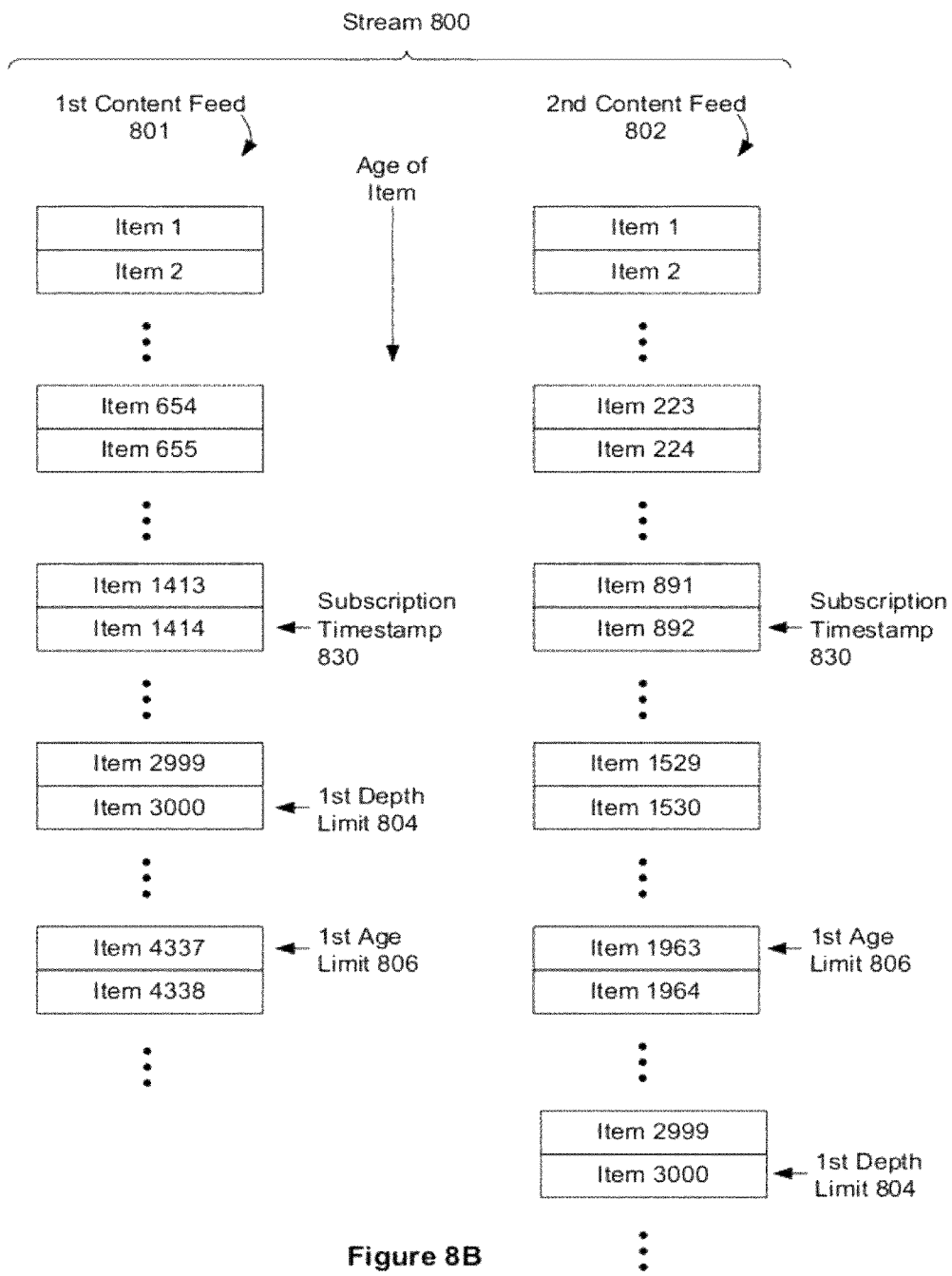

In an example, as illustrated in FIG. 8B, a user subscribed to a stream 800 that includes first 801 and second 802 constituent content feeds, at a time corresponding to a recorded subscription timestamp 830. In this example, item 1414 in the first constituent content feed 801 and item 892 in the second constituent content feed 802 are the last items in their respective content feeds to have timestamps later than or equal to the subscription timestamp 830, and thus are the last items fetched from their respective content feeds. A total of 2306 items are fetched from the two constituent content feeds 801 and 802. It remains to be determined how many of the 2306 fetched items are unread.

In other examples, a respective content feed in the stream may have a distinct subscription timestamp corresponding to when the respective content feed was added to the stream. In quantifying unread content items from the respective content feed, no content items with timestamps earlier than the subscription timestamp are fetched.

In some embodiments, the count excludes items in the time-ordered list in accordance with a timestamp indicating user execution of a mark-all-read command associated with the stream (710). For example, when fetching content items in each constituent content feed, no content items are fetched with timestamps earlier than a recorded time of execution of a mark-all-read command. In some embodiments, a mark-all-read command is executed by selecting an icon 406 (FIG. 4A). The unread count thus will not include items that predate execution of the mark-all-read command.

Figure 8C:
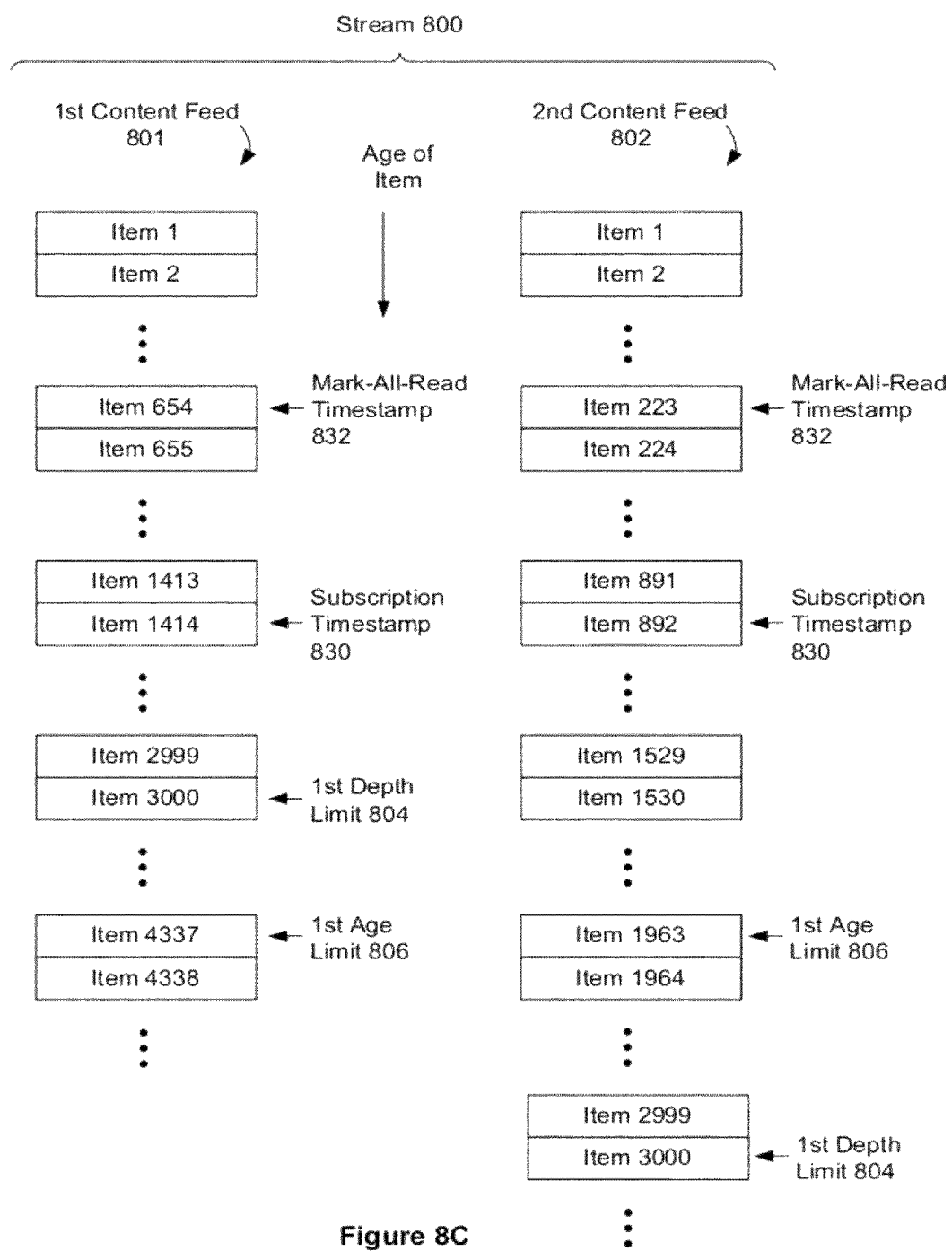

In an example, as illustrated in FIG. 8C, a mark-all-read command was executed for a stream 800 that includes first 801 and second 802 constituent content feeds, at a time corresponding to a recorded mark-all-read timestamp 832. In this example, item 654 in the first constituent content feed 801 and item 223 in the second constituent content feed 802 are the last items in their respective content feeds to have timestamps later than or equal to the mark-all-read timestamp 832, and thus are the last items fetched from their respective content feeds. A total of 877 items are fetched from the two constituent content feeds 801 and 802. It remains to be determined how many of the 877 fetched items are unread.

In some embodiments, the count excludes items in the time-ordered list in accordance with a timestamp indicating user execution of a mark-all-read command associated with a constituent stream of the stream (712). Thus, if a user subscribed directly to a particular stream, and also subscribed to second stream (e.g., a virtual stream) that included the particular content stream, then execution of a mark-all-read command associated directly with the particular stream would cause items from the particular stream to appear in both subscriptions to have been read.

In some embodiments, the count excludes items in the time-ordered list in accordance with a second predefined age limit and a second predefined depth limit as applied to a time-ordered read list identifying items in the stream for which a stored read status indicates that the items have been read (714). Items on the time-ordered read list are filtered from the items that were fetched from the stream's constituent content feeds, to determine the unread count. The time-ordered read list is sometimes referred to as a user's read stream or exclude stream.

The exclude stream may be created by fetching content items in the stream with a status indicating that they have been read, up to the second predefined age limit or the second predefined depth limit, whichever is reached first. To determine the count of unread items, these items are filtered out from the content items that were fetched from the stream's constituent content feeds in accordance with the first predefined depth limit, the first predefined age limit, the subscription timestamp, and/or the mark-all-read timestamp.

In an example, the second predefined age limit is 30 days and the second predefined depth limit is 10,000 content items. FIGS. 8D and 8E illustrate respective streams 810 and 812 that include respective time-ordered lists of content items from two or more content feeds. The content items from the constituent content feeds of each stream 810 and 812 have been combined into a single time-ordered list, as shown respectively in FIGS. 8D and 8E. Each item has a read status 822 indicating whether the item is read or unread. In the example of FIG. 8D, read items in the stream 810 are fetched up to the second age limit 814, which is reached prior to the second depth limit 816. Item 6300, which is the 3487th read item in the stream 810, has a timestamp that is 30 days old, and thus is the last item 818 fetched into the exclude stream of the stream 810. Items fetched into the exclude stream are shown in bold. In the example of FIG. 8E, read items in the stream 812 are fetched up to the second depth limit 816, which is reached prior to the second age limit 814. Item 19,322, which is the 10,000th read item in the stream 812, is the last item 820 fetched into the exclude stream of the stream 812. Again, items fetched into the exclude stream are shown in bold.

In some embodiments, the count excludes items in the time-ordered list that have timestamps earlier than a timestamp of a last item, determined in accordance with the second predefined age limit and the second predefined depth limit, having a read status indicating that the item has been read (716). For example, the last item is the item in the user's read stream (i.e., exclude stream) having either a depth equal to the second predefined depth limit (e.g., last item 820, FIG. 8E) or a timestamp corresponding to the second predefined age limit (e.g., last item 818, FIG. 8D), whichever is reached first. Content items having timestamps earlier than the timestamp of the last item are filtered out, for example in a manner similar to filtering out items in the exclude stream.

The count is transmitted to a client system (e.g., client system 102) for display (718).

Figure 7B:
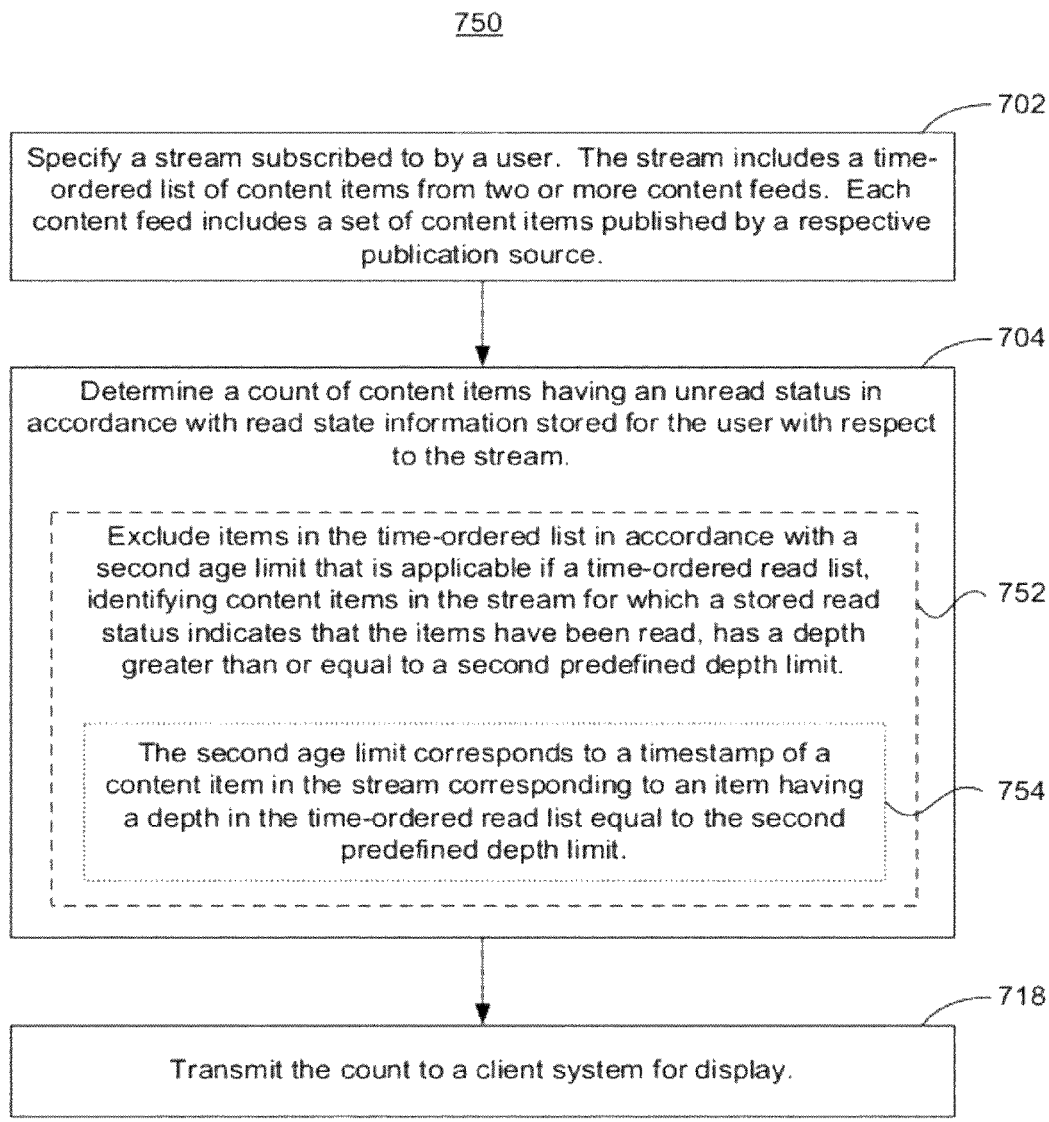

FIG. 7B is a flow diagram illustrating a method 750 of quantifying unread content items in accordance with some embodiments. The method 750, like method 700, may be used to calculate the unread counts displayed in the list 305 of labels in FIG. 4A.

As in method 700, a stream subscribed to by a user is specified (702) and a count of content items that have an unread status is determined (704) in accordance with read state information stored for the user with respect to the stream.

In some embodiments, the count excludes items in the time-ordered list in accordance with a second age limit that is applicable if a time-ordered read list, identifying content items in the stream for which a stored read status indicates that the items have been read (i.e., the stream's exclude stream), has a depth greater than or equal to a second predefined depth limit (752). In some embodiments, the second age limit corresponds to a timestamp of a content item in the stream corresponding to an item having a depth in the time-ordered read list equal to the second predefined depth limit (754). For example, if the second predefined depth limit is equal to 10,000 for the stream 812 shown in FIG. 8E, then the second age limit would correspond to a timestamp associated with item 19,322. Item 19,322 would be the last item 820 fetched into the exclude stream, and content items having timestamps earlier than the timestamp associated with item 19,322 would be filtered out.

The count is transmitted to a client system (e.g., client system 102) for display (718).

Figure 9:
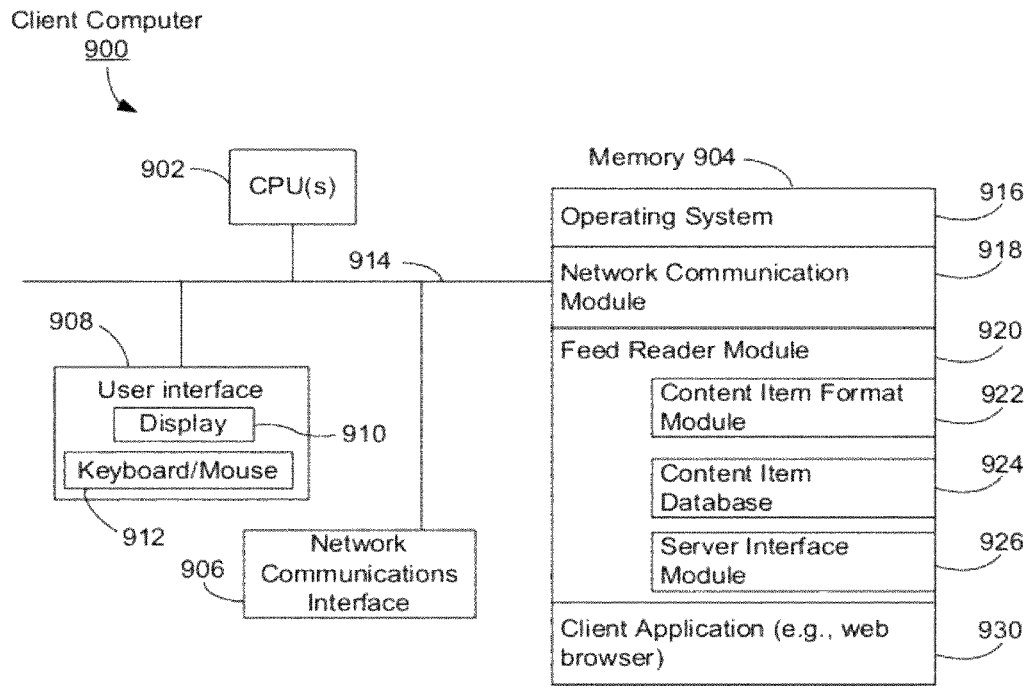
FIG. 9 is a block diagram illustrating a client computer in accordance with some embodiments.

FIG. 9 is a block diagram illustrating a client computer 900 in accordance with some embodiments. The client computer 900 typically includes one or more processing units (CPU's) 902, one or more network or other communications interfaces 906, memory 904, and one or more communication buses 914 for interconnecting these components. The communication buses 914 may include circuitry (sometimes called a chipset) that interconnects and controls communications between system components. The client computer 900 may also include a user interface 908 comprising a display device 910 and a keyboard and/or mouse (or other pointing device) 912. Memory 904 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 904 may optionally include one or more storage devices remotely located from the CPU(s) 902. Memory 904, or alternately non-volatile memory device(s) within memory 904, comprises a computer readable storage medium. In some embodiments, memory 904 stores the following programs, modules and data structures, or a subset thereof:

- an operating system 916 that includes procedures for handling various basic system services and for performing hardware dependent tasks;
- a network communication module 918 that is used for connecting the client system 900 to other computers via the one or more communication network interfaces 906 and one or more communication networks, such as the Internet, other wide area networks, local area networks, metropolitan area networks, and so on;
- a feed reader module 920 for handling content items from content feeds; and
- a client application 930, such as a web browser.

The feed reader module 920 includes a content item format module 922 for determining the format in which to display content items, a local database 924 for storing content items sent by the server, and a server interface module 926 for interfacing with server computer 1000.

In some embodiments, the feed reader module 920 may be a script-based module, embedded in a web page served from the server system 104 (FIG. 1). The web page may be rendered by a client application 930, such as a web browser, at the client computer 900. When the web page is rendered, the feed reader module 920 is executed, thereby providing a web-based interface to the server system 104. The script-based feed reader module may be written in JavaScript, ECMAScript or any other suitable scripting language.

In some other embodiments, the feed reader module 920 may be a standalone application stored in memory 904 of the client computer 900. The standalone application may include, but is not limited to a feed aggregator application. In further other embodiments, the feed reader module 920 may be an add-on or a plug-in to another application. For, example, the feed reader module 920 may be a plug-in or extension to a web browser application or an email application.

In some embodiments, received content items may be cached locally in memory 904. Similarly, a user's list of content feed subscriptions may also be cached locally in memory 904.

Each of the above identified elements in FIG. 9 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 904 may store a subset of the modules and data structures identified above. Furthermore, memory 904 may store additional modules and data structures not described above.

Figure 10:
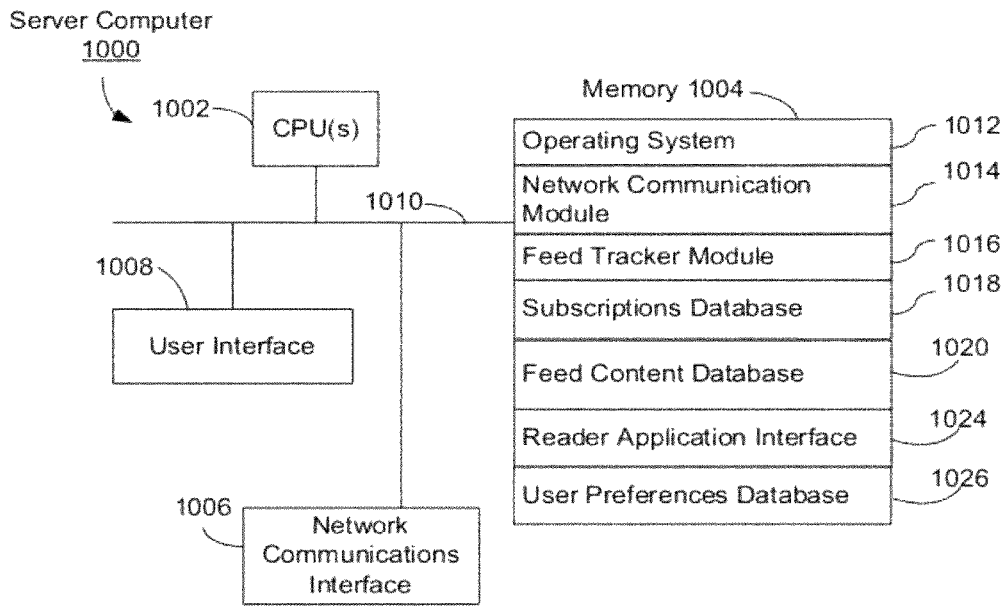
FIG. 10 is a block diagram illustrating a server computer in accordance with some embodiments.

FIG. 10 is a block diagram illustrating a server computer 1000 in accordance with some embodiments. The server computer 1000 typically includes one or more processing units (CPU's) 1002, one or more network or other communications interfaces 1006, memory 1004, and one or more communication buses 1010 for interconnecting these components. The communication buses 1010 may include circuitry (sometimes called a chipset) that interconnects and controls communications between system components. The server system 1000 optionally may include a user interface 1008, which may include a display device (not shown), and a keyboard and/or a mouse (not shown). Memory 1004 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1004 may optionally include one or more storage devices remotely located from the CPU(s) 1002. Memory 1004, or alternately non-volatile memory device(s) within memory 1004, comprises a computer readable storage medium. In some embodiments, memory 1004 stores the following programs, modules and data structures, or a subset thereof:

an operating system 1012 that includes procedures for handling various basic system services and for performing hardware dependent tasks;

a network communication module 1014 that is used for connecting the server system 1000 to other computers via the one or more communication network interfaces 1006 and one or more communication networks, such as the Internet, other wide area networks, local area networks, metropolitan area networks, and so on;

a feed tracker module 1016 for retrieving content items for storage periodically and/or as content feeds are updated;

a subscriptions database 1018 for storing information about the content feed subscriptions of users of the system;

a feed content database 1020, for storing content items from content feeds and user information about content items that respective users have read, labeled, and so on;

a reader application interface 1024 for exchanging information with the feed reader modules in one or more client computers; and a user preferences database 1026 for storing user-specific information, including user preferences with regard to the user interface.

Each of the above identified elements in FIG. 10 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1004 may store a subset of the modules and data structures identified above. Furthermore, memory 1004 may store additional modules and data structures not described above.

Although FIG. 10 shows a "server computer," FIG. 10 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 10 could be implemented on single servers and single items could be implemented by one or more servers.

Figure 11A:
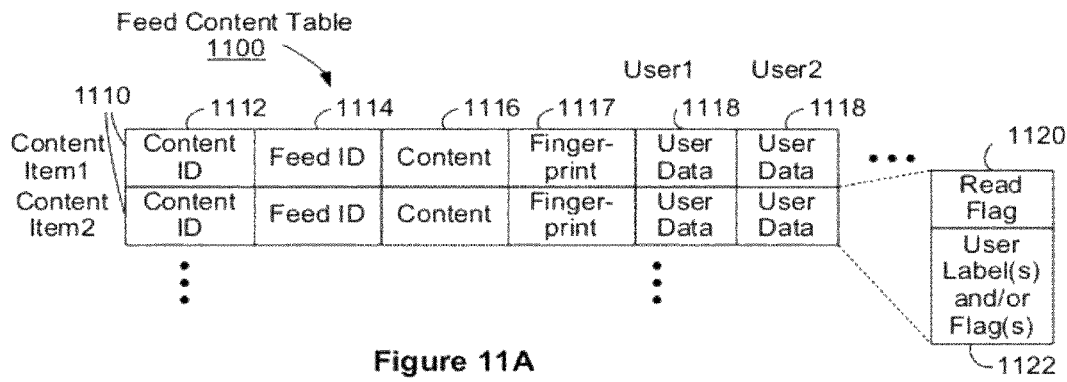

FIG. 11A is a diagram illustrating a data structure for feed content items, in accordance with some embodiments. As described above, a server computer 1000 (FIG. 10) may store a plurality of feed content items in feed content database 1020. The feed content items may be stored in a data structure, such as a table data structure 1100. The feed content table 1100 includes a row 1110 for each content item from each feed source. Each row includes one or more fields (1112, 1114) that identify the content item, such as a content ID 1112 and a feed ID 1114 (which identifies the feed source of the content item). In some embodiments, the content ID may include information that uniquely identifies the feed source, in which case the feed ID 1114 may be omitted. Each row 1110 may further include content 1116 and a content fingerprint 1117 of the content item. The content 1116 may include the metadata of the content item (e.g., title, description, URL, date/time, and possibly other metadata), and may further include the actual content of the content item. In some embodiments, the content fingerprint 1117 of a content item may be generated by applying a hash function to the content 1116 of the item, and the web page or document, if any, referenced by the content item (e.g., referenced by a URL or publisher-assigned ID in the content item). In addition, each row 1110 includes a column 1118 or field for each registered user of the system. The user data in this column may include a read flag 1120, which indicates whether the user corresponding to this column has read the content item associated with the row 1110 containing the user data. The user data in column 1118 also may optionally include additional user information, such as one or more user specified labels or flags 1122. A user may tag or label content items, as well as content feeds, and a record of the tag or label that the user associated with each labeled content item is stored in the user data 1118. In some embodiments, the system may allow users to tag or label individual content items with predefined tags or labels (e.g., star, red, blue, etc.), and some embodiments further allow users to tag or label individual content items with user-defined labels (e.g., "news," "music," etc.). Furthermore, a content item, represented by a row 1110, may by tagged by any number of users.

Figure 11B:
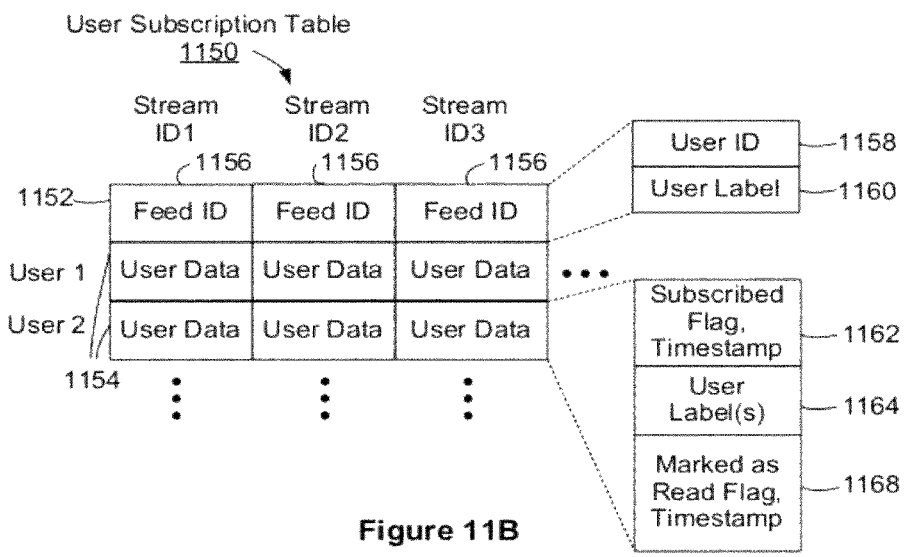

FIG. 11B is a diagram illustrating a data structure for user subscriptions, in accordance with some embodiments. As described above, a server computer 1000 (FIG. 10) may store user subscription information in subscriptions database 1018. The user subscription information may be stored in a data structure, such as a table data structure 1150. A user subscription information table 1150 stores feed identifications for feed streams known to the system and user data for those feed streams. The user subscription table 1150 includes fields or columns 1156 corresponding to the stream ID's for each content stream known to the system, including both real content streams (typically corresponding to content streams from publication sources at well defined network locations) and virtual content streams. A virtual content stream is a content stream derived from one or more other content streams within the context of the server system 104. For example, a virtual content stream may include a set of real content streams assigned a label by a user. In another example, a virtual stream may include individual content items assigned a particular label by a user; the labeled content items may be from one or more real content streams. In one embodiment, a virtual stream can be identified by the user who created the stream and the user label assigned to the virtual stream by the user. Thus, the stream ID of a virtual stream may include the user ID 1158 of the user who created the virtual stream and the user label 1160 assigned to the virtual stream by that user. Alternately, the stream ID of a virtual stream may be generated or assigned by a mapping function that maps virtual streams to virtual stream ID's.

Table 1150 further includes a row 1154 for each user, with fields or columns 1156 containing user data for each content stream. In some embodiments, the user data for a respective content stream includes a subscribed flag and timestamp 1162 indicating whether and when the user has subscribed to the content stream associated with the column 1156 containing the user data. The user data may also include a marked-as-read flag and timestamp 1168, which indicates whether and when the user corresponding to the row has viewed the items in the content stream associated with the column 1156. The user data may further include additional user information, such as one or more user specified labels 1164. A user may label content streams that the user may want to view again in the future, and a record of the label that the user associated with a content stream may be stored in the user data 1156.

Figure 11C:
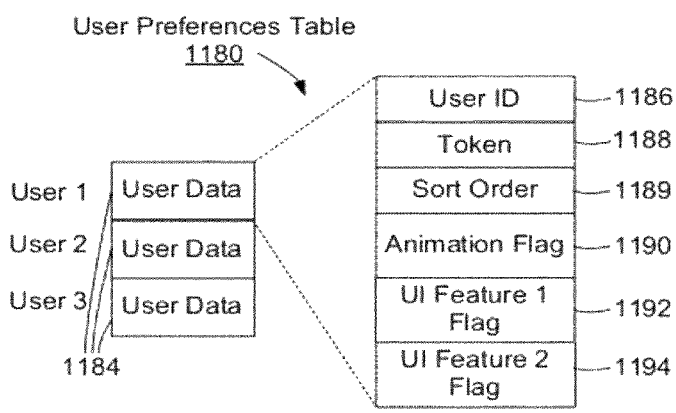

FIG. 11C is a diagram illustrating a data structure for user preferences, in accordance with some embodiments. As described above, a server computer 1000 (FIG. 10) may store user preference information in user preferences database 1026. The user preference information may be stored in a data structure, such as a table data structure 1180. User preferences table 1180 contains user data 1184 (e.g., in a row or record of the table 1180) for each user. The user data 1184 optionally includes a user ID 1186 (which may be implied by the location of the user data 1184 in the user preferences table 1180), and a token 1188 used by server 1000 to authenticate requests from the user. In some embodiments, the token 1188 is generated using a random or pseudo-random number generator or function, and is of sufficient length that it would be impractical to guess or independently replicate the token.

The user data optionally may include one or more additional fields 1189, 1190, 1192, and 1194. For example, the user data optionally may include a sort order flag 1189, for specifying the order in which to display content items on a user interface, such as user interface 302 (FIG. 3A). For example, content items may be displayed in chronological order or according to a ranking based on predefined criteria (e.g., the quantity and/or quality of the content in the content items, as well as the recency of the content items). The user data may further include an animation flag 1190 to indicate whether or not to display animations on the user interface. The user data may include user interface feature flags or parameter values (1192, 1194) to specify other user interface characteristics associated with the user. For example, user interface feature flags may be used to specify the formatting and color of a user interface. User interface feature flags may specify whether to display items with a status indicating that they have been read in a visually distinctive format from unread items or whether not to display items with a status indicating that they have been read. In an embodiment, users may set the sort order flag, the animation flag and user interface feature flags via menus accessible from the user interface (not shown).

Feed content table 1100, user subscription table 1150, and user preferences table 1180, or portions of these tables, may be stored using sparse table storage mechanisms, since large portions of the user data in these tables may be empty or set to default values.

FIG. 11D is a diagram illustrating an example of a user subscription table, such as user subscription table 1150 (FIG. 11B), in accordance with some embodiments. As explained above, user subscription table 1150 includes rows for each user known to the system and columns for each content stream known to the system, including both real and virtual content streams. In the example of user subscription table 1125, columns 1130 and 1132 are associated with real content streams, corresponding to streams from publication sources at well-defined network locations. Specifically, stream 1 (1130) is available at a network location indicated by URL1 and stream 2 (1132) is available at a network location indicated by URL2. In an embodiment, the URL's associated with real streams are used as feed ID's and are listed in row 1140 of user subscription table 1125. The check mark under stream 1 (1130) for user 3 (1146) indicates that user 3 has subscribed to stream 1.

Columns 1134, 1136 and 1138 are associated with virtual content streams, defined as streams derived from one or more other content streams. For example, user 1 (1142) has subscribed to streams 1 (1130) and 2 (1132) and assigned the label "tech" to both streams, as indicated by the check mark and text "label:tech" at the intersection of row 1142 with columns 1130 and 1132. User 1 thereby created stream 3 (1134), a virtual stream. In some embodiments, a respective virtual stream is given a feed ID that includes a user name or identifier and a label assigned by a respective user (e.g., the feed ID may have the form "user#:label"). Examples of such feed ID's are listed in row 1140 of FIG. 11D. In this example, stream 3 has the feed ID "User1:tech." Because the feed ID of a respective virtual stream includes the user name or identifier of the user who defined the virtual stream, multiple users may use the same label without conflict. For example, user 25 (row not shown) has assigned the label "tech" to one or more streams, resulting in stream 5 (1138) with feed ID "User25:tech".

Some virtual streams may correspond to (or may include) individual content items on one or more content feeds that have been labeled by a respective user. For example, a user (e.g., "user 99") may mark or label specific content feed items as "favorite" items, or the user may assign a user-specified label (e.g., "best" or "reviews") to specific feed items. If the set of user labeled items is made available for subscription by others, the user-labeled items become a virtual stream that is assigned a stream identifier, such as "user99:best". This virtual stream is assigned a column in the user subscription table 1125 and subscription and user labeling information for the virtual stream is stored in this column.

Check marks in column 1134 associated with stream 3 indicate which other users have subscribed to stream 3. In this example, user 2 (1144) has subscribed to stream 3 and assigned the label "friends" to it. User 2 also has assigned the label "friends" to stream 5 (1138), created by user 25. User 2 thereby created stream 4 (1136), which has feed ID "User2:friends". Stream 4 (1136) thus is a virtual stream comprising other virtual streams (stream 3 and stream 5), demonstrating that multiple levels of recursion are allowed for virtual streams. User 3 (1146) has subscribed to stream 4 (1136). If user 3 desired, he could label stream 4, thereby creating another virtual stream with an additional level of recursion, and another user could subscribe to that virtual stream.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of quantifying unread content items, comprising:

at a computing system having one or more processors and memory storing one or more program for execution by the one or more processors:

for a stream subscribed to by a user, wherein the stream comprises a time-ordered set of content items:

determining, for display to the user, a numeric count of content items in the stream having an unread status in accordance with read state information stored for the user with respect to the stream, wherein determining the numeric count for display to the user comprises: excluding, from the numeric count, regardless of actual read status, items in the time-ordered set in accordance with a first predefined depth limit and a first subscription timestamp, wherein the first predefined depth limit specifies a threshold total number of content items, included in the content items, provided by a content feed associated with the stream; and wherein the first subscription timestamp specifies a time when the user subscribed to a source providing content items to the stream; and formatting for display to the user the numeric count of content items in the stream having the unread status.

2. The method of claim 1, wherein determining the count comprises:

excluding, from the count, items in the time-ordered set, in accordance with a first predefined age limit, a second predefined age limit, and a second predefined depth limit as applied to a time-ordered read set, the time-order read set identifying content items in the stream for which a stored read status indicates that the content items have been read.

3. The method of claim 2, wherein determining the count further comprises:

excluding, from the count, items in the time-ordered set having timestamps earlier than a timestamp of a last item, determined in accordance with the second predefined age limit and the second predefined depth limit, having a read status indicating that the last item has been read.

4. The method of claim 1, wherein determining the count further comprises:

excluding, from the count, items in the time-ordered set in accordance with a timestamp indicating user execution of a mark-all-read command associated with the stream.

5. The method of claim 1, wherein:

the stream comprises one or more constituent streams, and determining the count further comprises:

excluding, from the count, items in the time-ordered set in accordance with a timestamp indicating user execution of a mark-all-read command associated with a constituent stream in the one or more constituent streams.

6. The method of claim 1, wherein determining the count further comprises:

excluding, from the count, items in the time-ordered set in accordance with a first predefined age limit and a second predefined age limit that are applicable, if a time-ordered read set identifying content items in the stream for which a stored read status indicates that the items have been read, has a depth greater than or equal to a second predefined depth limit.

7. The method of claim 6, wherein the second age limit corresponds to a timestamp of a content item in the stream, the content item further corresponding to an item having a depth in the time-ordered read set equal to the second predefined depth limit.

8. The method of claim 1, wherein the stream has been defined by another user distinct from the subscribing user.

9. A system for quantifying unread content items in a stream subscribed to by a user, wherein the stream comprises a time-ordered set of content items, comprising:

memory;

one or more processors;

one or more programs stored in the memory and configured for execution by the one or more processors, the one or more programs including:

instructions for determining, for display to a user, a numeric count of content items in the stream having an unread status in accordance with read state information stored for the user with respect to the stream, the determining the numeric count for display to the user comprising:

excluding, from the numeric count, regardless of actual read status, items in the time-ordered set in accordance with a first predefined depth limit and a first subscription timestamp, wherein the first predefined depth limit specifies a threshold total number of content items, included in the content items, provided by a content feed associated with the stream; and wherein the first subscription timestamp specifies a time when the user subscribed to a source providing content items to the stream; and instructions for formatting for display to the user the numeric count of content items in the stream having the unread status.

10. The system of claim 9, wherein the determining further comprises:

excluding, from the count, items in the time-ordered set, in accordance with a first predefined age limit, a second predefined age limit, and a second predefined depth limit as applied to a time-ordered read set, the time-ordered read set identifying content items in the stream for which a stored read status indicates that the content items have been read.

11. The system of claim 10, wherein determining the count further comprises:

excluding, from the count, items in the time-ordered set having timestamps earlier than a timestamp of a last item, determined in accordance with the second predefined age limit and the second predefined depth limit, having a read status indicating that the last item has been read.

12. The system of claim 9, wherein the determining further comprises:

excluding, from the count, items in the time-ordered set in accordance with a timestamp indicating user execution of a mark-all-read command associated with the stream.

13. The system of claim 9, wherein:

the stream comprises one or more constituent streams, and the determining further comprises:

excluding, from the count items, in the time-ordered set in accordance with a timestamp indicating user execution of a mark-all-read command associated with a constituent stream in the one or more constituent streams.

14. The system of claim 9, wherein determining the count further comprises:

excluding, from the count, items in the time-ordered set in accordance with a second age limit that is applicable if a time-ordered read set identifying content items in the stream for which a stored read status indicates that the items have been read, has a depth greater than or equal to a second predefined depth limit.

15. The system of claim 14, wherein the second age limit corresponds to a timestamp of a content item in the stream, the content item further corresponding to an item having a depth in the time-ordered read set equal to the second predefined depth limit.

16. The system of claim 9, wherein the stream has been defined by another user distinct from the subscribing user.

17. A non-transitory computer readable storage medium storing one or more programs for use in quantifying unread content items in a stream subscribed to by a user, wherein the stream comprises a time-ordered set of content items, the one or more programs configured to be executed by a computer system and comprising:

instructions for determining, for display to a user, a numeric count of content items in the stream having an unread status in accordance with read state information stored for the user with respect to the stream, the determining the numeric count for display to the user comprising:

excluding, from the numeric count, regardless of actual read status, items in the time-ordered set in accordance with a first predefined depth limit and a first subscription timestamp, wherein the first predefined depth limit specifies a threshold total number of content items, included in the content items, provided by a content feed associated with the stream; and wherein the first subscription timestamp specifies a time when the user subscribed to a source providing content items to the stream; and instructions for formatting for display to the user the numeric count of content items in the stream having the unread status.

18. The non-transitory computer readable storage medium of claim 17, wherein the determining further comprises:

excluding, from the count, items in the time-ordered set, in accordance with a first predefined age limit, a second predefined age limit, and a second predefined depth limit as applied to a time-ordered read set identifying content items in the stream for which a stored read status indicates that the content items have been read.

19. The non-transitory computer readable storage medium of claim 18, wherein determining the count further comprises:

excluding, from the count, items in the time-ordered set having timestamps earlier than a timestamp of a last item, determined in accordance with the second predefined age limit and the second predefined depth limit, having a read status indicating that the last item has been read.

20. The non-transitory computer readable storage medium of claim 17, wherein the determining further comprises:

excluding, from the count, items in the time-ordered set in accordance with a timestamp indicating user execution of a mark-all-read command associated with the stream.

21. The non-transitory computer readable storage medium of claim 17, wherein:

the stream comprises one or more constituent streams, and the determining further comprises:

excluding, from the count, items in the time-ordered set in accordance with a timestamp indicating user execution of a mark-all-read command associated with a respective constituent stream.

22. The non-transitory computer readable storage medium of claim 17, wherein determining the count further comprises:

excluding, from the count, items in the time-ordered set in accordance with a second age limit that is applicable if a time-ordered read set identifying content items in the stream for which a stored read status indicates that the items have been read, has a depth greater than or equal to a second predefined depth limit.

23. The non-transitory computer readable storage medium of claim 22, wherein the second age limit corresponds to a timestamp of a content item in the stream, the content item further corresponding to an item having a depth in the time-ordered read set equal to the second predefined depth limit.

24. The non-transitory computer readable storage medium of claim 17, wherein the stream has been defined by another user distinct from the subscribing user.

* * * * *